(12) United States Patent
Kendall et al.

(10) Patent No.: US 12,112,637 B2
(45) Date of Patent: Oct. 8, 2024

(54) EXTERIOR MIRROR ASSEMBLY WITH BLIND ZONE INDICATION MODULE

(71) Applicant: MAGNA MIRRORS OF AMERICA, INC., Holland, MI (US)

(72) Inventors: Craig Kendall, Grand Haven, MI (US); Jeremy R. Shooks, Plainwell, MI (US); Mark E. Kramer, Zeeland, MI (US); Mark L. Larson, Grand Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 442 days.

(21) Appl. No.: 17/653,494

(22) Filed: Mar. 4, 2022

(65) Prior Publication Data

US 2022/0189310 A1    Jun. 16, 2022

Related U.S. Application Data

(63) Continuation of application No. 17/249,625, filed on Mar. 8, 2021, now Pat. No. 11,270,590, which is a continuation of application No. 16/946,936, filed on Jul. 13, 2020, now Pat. No. 10,943,488, which is a continuation of application No. 16/729,794, filed on Dec. 30, 2019, now Pat. No. 10,713,953, which is a continuation of application No. 16/234,747, filed on Dec. 28, 2018, now Pat. No. 10,522,042, which is a continuation of application No. 15/844,996, filed on
(Continued)

(51) Int. Cl.
*G08G 1/16* (2006.01)
*B60R 1/00* (2022.01)
*B60R 1/06* (2006.01)
*B60R 1/12* (2006.01)

(52) U.S. Cl.
CPC .............. *G08G 1/167* (2013.01); *B60R 1/006* (2013.01); *B60R 1/06* (2013.01); *B60R 1/12* (2013.01); *B60R 1/1207* (2013.01); *B60R 2001/1215* (2013.01)

(58) Field of Classification Search
CPC .. B60R 1/006; B60R 1/06; B60R 1/12; B60R 1/1207; B60R 2001/1215; G08G 1/167
See application file for complete search history.

(56) References Cited

U.S. PATENT DOCUMENTS 2,263,382 A    11/1941    Gotzinger
2,580,014 A    12/1951    Gazda
(Continued)

*Primary Examiner* — Nader Bolourchi
(74) *Attorney, Agent, or Firm* — HONIGMAN LLP

(57) ABSTRACT

A vehicular exterior rearview mirror assembly includes a mirror reflective element, a mirror back plate, and a blind zone indication module having a light source that is electrically powered to emit light. When the light source of the blind zone indication module is electrically powered, light emitted by the light source passing through (i) a light-transmitting portion of a housing of the blind zone indication module and (ii) a light-transmitting aperture of the mirror back plate illuminates an icon that is viewable to a driver of the vehicle who views the mirror reflective element. Illumination of the icon is responsive to a blind spot detection system of the vehicle detecting presence of another vehicle that is traveling in the same direction and in a lane adjacent to a lane that the equipped vehicle is traveling in and that is approaching or is overtaking the equipped vehicle.

36 Claims, 23 Drawing Sheets

Related U.S. Application Data

Dec. 18, 2017, now Pat. No. 10,170,001, which is a continuation of application No. 15/690,901, filed on Aug. 30, 2017, now Pat. No. 9,847,028, which is a continuation of application No. 15/600,827, filed on May 22, 2017, now Pat. No. 9,754,489, which is a continuation of application No. 15/278,109, filed on Sep. 28, 2016, now Pat. No. 9,659,498.

(60) Provisional application No. 62/233,728, filed on Sep. 28, 2015.

(56) References Cited

U.S. PATENT DOCUMENTS

| | | |
|---|---|---|
| 3,266,016 A | 8/1966 | Maru |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |
| 4,906,085 A | 3/1990 | Sugihara et al. |
| 4,931,627 A | 6/1990 | Watts |
| 4,932,769 A | 6/1990 | Goosen |
| 4,932,770 A | 6/1990 | Caravaty |
| 4,951,179 A | 8/1990 | Machida |
| 4,989,964 A | 2/1991 | Meise |
| 5,005,962 A | 4/1991 | Edelman |
| 5,014,167 A | 5/1991 | Roberts |
| 5,016,996 A | 5/1991 | Ueno |
| 5,017,903 A | 5/1991 | Krippelz, Sr. |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,059,015 A | 10/1991 | Tran |
| 5,078,480 A | 1/1992 | Warszawski |
| 5,080,492 A | 1/1992 | Platzer, Jr. |
| 5,107,374 A | 4/1992 | Lupo et al. |
| 5,115,352 A | 5/1992 | do Espirito Santo |
| 5,118,540 A | 6/1992 | Hutchison |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,247,395 A | 9/1993 | Martinez |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,355,284 A | 10/1994 | Roberts |
| 5,361,190 A | 11/1994 | Roberts et al. |
| 5,400,246 A | 3/1995 | Wilson et al. |
| 5,402,103 A | 3/1995 | Tashiro |
| 5,412,512 A | 5/1995 | Zebold et al. |
| 5,424,875 A | 6/1995 | Davis, II |
| 5,432,643 A | 7/1995 | Huang |
| 5,436,741 A | 7/1995 | Crandall |
| 5,437,931 A | 8/1995 | Tsai et al. |
| 5,438,487 A | 8/1995 | Schmid et al. |
| 5,481,409 A | 1/1996 | Roberts |
| 5,497,305 A | 3/1996 | Pastrick et al. |
| 5,497,306 A | 3/1996 | Pastrick |
| 5,509,606 A | 4/1996 | Breithaupt et al. |
| 5,517,367 A | 5/1996 | Kim et al. |
| 5,525,264 A | 6/1996 | Cronin et al. |
| 5,526,195 A | 6/1996 | Thomas |
| 5,528,422 A | 6/1996 | Roberts |
| 5,530,588 A | 6/1996 | Vivier |
| 5,535,056 A | 7/1996 | Caskey et al. |
| 5,557,467 A | 9/1996 | McColgan et al. |
| 5,563,744 A | 10/1996 | Matsumiya |
| 5,575,552 A | 11/1996 | Faloon et al. |
| 5,579,133 A | 11/1996 | Black et al. |
| 5,587,699 A | 12/1996 | Faloon et al. |
| 5,619,374 A | 4/1997 | Roberts |
| 5,621,569 A | 4/1997 | Schlenke |
| 5,621,577 A | 4/1997 | Lang et al. |
| 5,632,551 A | 5/1997 | Roney et al. |
| 5,644,442 A | 7/1997 | Lemere |
| 5,649,756 A | 7/1997 | Adams et al. |
| 5,786,772 A | 7/1998 | Schofield et al. |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,532 A | 8/1998 | Kanazawa |
| 5,835,294 A | 11/1998 | Minegishi |
| 5,838,505 A | 11/1998 | Palathingal |
| 5,847,889 A | 12/1998 | Komiyama et al. |
| 5,929,786 A | 7/1999 | Schofield et al. |
| 5,938,320 A | 8/1999 | Crandall |
| 5,959,529 A | 9/1999 | Kail, IV |
| 5,980,050 A | 11/1999 | McCord |
| 6,005,724 A | 12/1999 | Todd |
| 6,007,207 A | 12/1999 | Liu |
| 6,007,222 A | 12/1999 | Thau |
| 6,030,084 A | 2/2000 | Schmidt |
| 6,032,323 A | 3/2000 | Smith et al. |
| 6,033,078 A | 3/2000 | Su et al. |
| 6,045,243 A | 4/2000 | Muth et al. |
| 6,064,508 A | 5/2000 | Forgette et al. |
| 6,065,840 A | 5/2000 | Caskey et al. |
| 6,111,683 A | 8/2000 | Cammenga et al. |
| 6,142,656 A | 11/2000 | Kurth |
| 6,164,564 A | 12/2000 | Franco et al. |
| 6,175,300 B1 | 1/2001 | Kendrick |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,993 B1 | 3/2001 | Mou |
| 6,206,553 B1 | 3/2001 | Boddy et al. |
| 6,213,612 B1 | 4/2001 | Schnell et al. |
| 6,227,689 B1 | 5/2001 | Miller |
| 6,229,435 B1 | 5/2001 | Knapp et al. |
| 6,244,716 B1 | 6/2001 | Steenwyk et al. |
| 6,257,746 B1 | 7/2001 | Todd et al. |
| 6,260,608 B1 | 7/2001 | Kim |
| 6,264,353 B1 | 7/2001 | Caraher et al. |
| 6,270,225 B1 | 8/2001 | Goolsby |
| 6,310,611 B1 | 10/2001 | Caldwell |
| 6,310,738 B1 | 10/2001 | Chu |
| 6,315,419 B1 | 11/2001 | Platzer, Jr. |
| 6,335,548 B1 | 1/2002 | Roberts et al. |
| 6,343,402 B1 | 2/2002 | Smith et al. |
| 6,347,880 B1 | 2/2002 | Furst et al. |
| 6,356,376 B1 | 3/2002 | Tonar et al. |
| 6,359,274 B1 | 3/2002 | Nixon et al. |
| 6,363,326 B1 | 3/2002 | Scully |
| 6,390,632 B1 | 5/2002 | Palathingal |
| 6,426,485 B1 | 7/2002 | Bulgajewski et al. |
| 6,441,943 B1 | 8/2002 | Roberts et al. |
| 6,467,920 B2 | 10/2002 | Schnell et al. |
| 6,501,387 B2 | 12/2002 | Skiver et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,537,138 B2 | 3/2003 | Ohmori et al. |
| 6,598,980 B2 | 7/2003 | Marusawa et al. |
| 6,598,982 B2 | 7/2003 | Witt |
| 6,612,708 B2 | 9/2003 | Chu |
| 6,615,438 B1 | 9/2003 | Franco et al. |
| 6,650,457 B2 | 11/2003 | Busscher et al. |
| 6,657,767 B2 | 12/2003 | Bonardi et al. |
| 6,669,109 B2 | 12/2003 | Ivanov et al. |
| 6,690,268 B2 | 2/2004 | Schofield et al. |
| 6,700,692 B2 | 3/2004 | Tonar et al. |

(56) References Cited

U.S. PATENT DOCUMENTS

| | | |
|---|---|---|
| 6,717,109 B1 | 4/2004 | Macher et al. |
| 6,882,287 B2 | 4/2005 | Schofield |
| 6,916,100 B2 | 7/2005 | Pavao |
| 6,919,796 B2 | 7/2005 | Boddy et al. |
| 6,932,483 B2 | 8/2005 | Strumolo et al. |
| 6,979,090 B1 | 12/2005 | Wnuk |
| 7,038,577 B2 | 5/2006 | Pawlicki et al. |
| 7,080,914 B1 | 7/2006 | Boddy |
| 7,097,312 B2 | 8/2006 | Platzer, Jr. |
| 7,106,392 B2 | 9/2006 | You |
| 7,126,456 B2 | 10/2006 | Boddy et al. |
| 7,289,037 B2 | 10/2007 | Uken et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,334,922 B2 | 2/2008 | Bonardi et al. |
| 7,342,707 B2 | 3/2008 | Roberts et al. |
| 7,345,680 B2 | 3/2008 | David |
| 7,349,143 B2 | 3/2008 | Tonar et al. |
| 7,517,099 B2 | 4/2009 | Hannah |
| 7,581,859 B2 | 9/2009 | Lynam |
| 7,944,371 B2 | 5/2011 | Foote et al. |
| 8,049,640 B2 | 11/2011 | Uken et al. |
| 8,058,977 B2 | 11/2011 | Lynam |
| 8,102,279 B2 | 1/2012 | Foote et al. |
| 8,287,164 B2 | 10/2012 | Fehn et al. |
| 8,305,235 B2 | 11/2012 | Foote et al. |
| 8,466,780 B2 | 6/2013 | Lynam et al. |
| 8,525,697 B2 | 9/2013 | Foote et al. |
| 8,779,937 B2 | 7/2014 | Foote et al. |
| 8,786,704 B2 | 7/2014 | Foote et al. |
| 9,013,288 B2 | 4/2015 | Foote et al. |
| 9,035,754 B2 | 5/2015 | Lynam |
| 9,162,624 B2 | 10/2015 | Foote et al. |
| 9,333,909 B2 | 5/2016 | Foote et al. |
| 9,505,350 B2 | 11/2016 | Foote et al. |
| 9,659,498 B2 | 5/2017 | Kendall et al. |
| 9,754,489 B1 | 9/2017 | Kendall et al. |
| 9,847,028 B1 | 12/2017 | Kendall et al. |
| 10,170,001 B2 | 1/2019 | Kendall et al. |
| 10,522,042 B2 | 12/2019 | Kendall et al. |
| 10,713,953 B2 | 7/2020 | Kendall et al. |
| 10,943,488 B2 | 3/2021 | Kendall et al. |
| 11,270,590 B2 | 3/2022 | Kendall et al. |
| 2002/0036828 A1 | 3/2002 | Wong |
| 2002/0105741 A1 | 8/2002 | Platzer |
| 2002/0159169 A1 | 10/2002 | McCord |
| 2003/0002179 A1 | 1/2003 | Roberts et al. |
| 2003/0043589 A1 | 3/2003 | Blank |
| 2003/0117731 A1 | 6/2003 | Platzer |
| 2004/0032638 A1 | 2/2004 | Tonar et al. |
| 2004/0165291 A1 | 8/2004 | Platzer |
| 2005/0078389 A1 | 4/2005 | Kulas et al. |
| 2005/0248859 A1 | 11/2005 | Platzer |
| 2006/0050018 A1 | 3/2006 | Hutzel et al. |
| 2006/0056086 A1 | 3/2006 | Hannah |
| 2006/0061008 A1 | 3/2006 | Karner et al. |
| 2006/0181772 A1 | 8/2006 | Byers et al. |
| 2006/0250224 A1 | 11/2006 | Steffel et al. |
| 2006/0268440 A1 | 11/2006 | Platzer |
| 2007/0058257 A1 | 3/2007 | Lynam |
| 2008/0225421 A1 | 9/2008 | Platzer |
| 2008/0316054 A1 | 12/2008 | Lynam et al. |
| 2009/0040306 A1 | 2/2009 | Foote et al. |
| 2009/0115631 A1 | 5/2009 | Foote et al. |
| 2010/0026475 A1 | 2/2010 | Hwang |
| 2010/0039691 A1 | 2/2010 | Thomas et al. |
| 2010/0110523 A1 | 5/2010 | Varaprasad et al. |
| 2011/0260845 A1 | 10/2011 | Henion et al. |
| 2013/0279033 A1 | 10/2013 | Lynam |
| 2015/0329054 A1 | 11/2015 | Neuman et al. |
| 2016/0078768 A1 | 3/2016 | Huizen et al. |
| 2016/0207466 A1 | 7/2016 | Lynam |

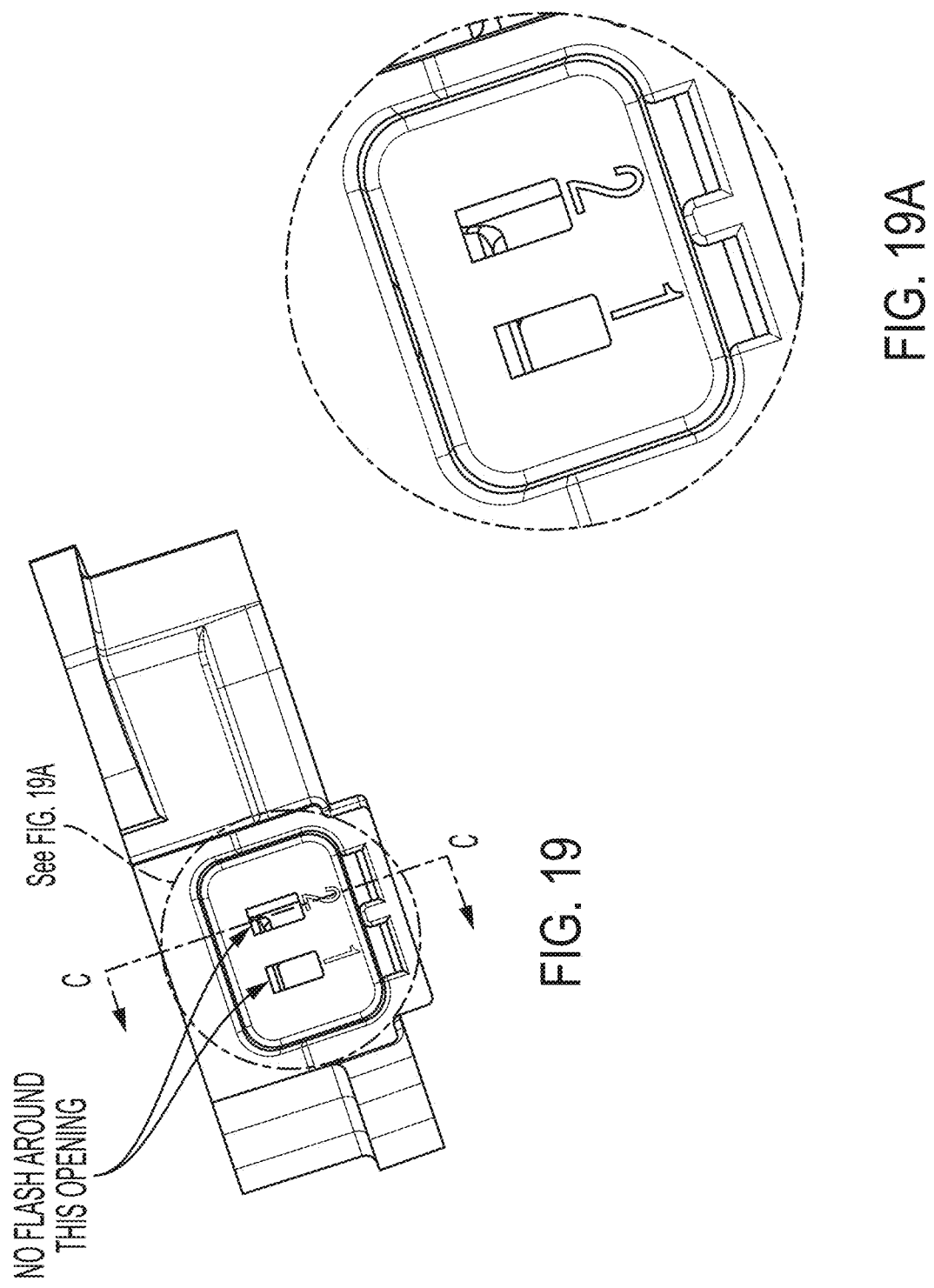

EXTERIOR MIRROR ASSEMBLY WITH BLIND ZONE INDICATION MODULE

CROSS REFERENCE TO RELATED APPLICATIONS

The present application is a continuation of U.S. patent application Ser. No. 17/249,625, filed Mar. 8, 2021, now U.S. Pat. No. 11,270,590, which is a continuation of U.S. patent application Ser. No. 16/946,936, filed Jul. 13, 2020, now U.S. Pat. No. 10,943,488, which is a continuation of U.S. patent application Ser. No. 16/729,794, filed Dec. 30, 2019, now U.S. Pat. No. 10,713,953, which is a continuation of U.S. patent application Ser. No. 16/234,747, filed Dec. 28, 2018, now U.S. Pat. No. 10,522,042, which is a continuation of U.S. patent application Ser. No. 15/844,996, filed Dec. 18, 2017, now U.S. Pat. No. 10,170,001, which is a continuation of U.S. patent application Ser. No. 15/690,901, filed Aug. 30, 2017, now U.S. Pat. No. 9,847,028, which is a continuation of U.S. patent application Ser. No. 15/600,827, filed May 22, 2017, now U.S. Pat. No. 9,754,489, which is a continuation of U.S. patent application Ser. No. 15/278,109, filed Sep. 28, 2016, now U.S. Pat. No. 9,659,498, which claims the filing benefits of U.S. provisional application Ser. No. 62/233,728, filed Sep. 28, 2015, which is hereby incorporated herein by reference in its entirety.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or other indicator at the exterior rearview mirror assembly.

BACKGROUND OF THE INVENTION

It is known to provide a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such a blind spot detection/LCA system often includes a visual indicator that visually indicates the detection of another vehicle or object to the driver of the host vehicle. It is also know to provide a turn signal indicator that is activated when a turn signal is activated by the driver of the equipped vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

A variety of interior and exterior mirror assemblies with indicators are known in the art, such as described in U.S. Pat. Nos. 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, and International Publication WO 95/30495, which are all hereby incorporated herein by reference in their entireties.

SUMMARY OF THE INVENTION

The present invention provides a blind zone or blind spot indicator or lane change assist (LCA) indicator or turn signal indicator or other indicator that is disposed at the mirror reflector carrier or back plate of the mirror reflector sub-assembly so as to be positioned at and attached to the mirror reflective element when the back plate is adhered or otherwise attached at the back of the mirror reflective element. Preferably, the signal indicator is provided as a sealed or substantially sealed unit or module that can be snapped into or otherwise attached or secured (preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater pad or other item or element) is joined to the mirror back plate.

The blind zone indicator of the present invention includes a housing with an inner surface or structure that is angled so that light emitted by one or more light sources (such as light emitting diodes) at the back or rear portion of the diffuser and housing is directed generally towards the side of the vehicle for viewing by the driver of the vehicle. The housing and module is attached at the rear of the reflective element (such as at a heater pad adhered at the rear surface of the reflective element or at the rear surface of the reflective element itself or at a rear surface of the mirror back plate) via an adhesive tape or foam tape element that may conform to the reflective element (such as to a curvature of the reflective element) while attaching the module at the rear of the reflective element. The module includes a circuit board, which is arranged generally parallel to the reflective element when the module is attached at the rear of the reflective element. Such an arrangement allows for a lower profile module, while the canted inner surface or structure directs or reflects the light emitted by the light sources or light emitting diodes in the desired direction, such as towards the driver of the vehicle.

These and other objects, advantages, purposes and features of the present invention will become apparent upon review of the following specification in conjunction with the drawings.

BRIEF DESCRIPTION OF THE DRAWINGS

FIG. 19 is an end view of a connector of the indicator module of the present invention;

FIG. 19A is an enlarged end view of the connector of FIG. 19;

DESCRIPTION OF THE PREFERRED EMBODIMENTS

Figure 1:
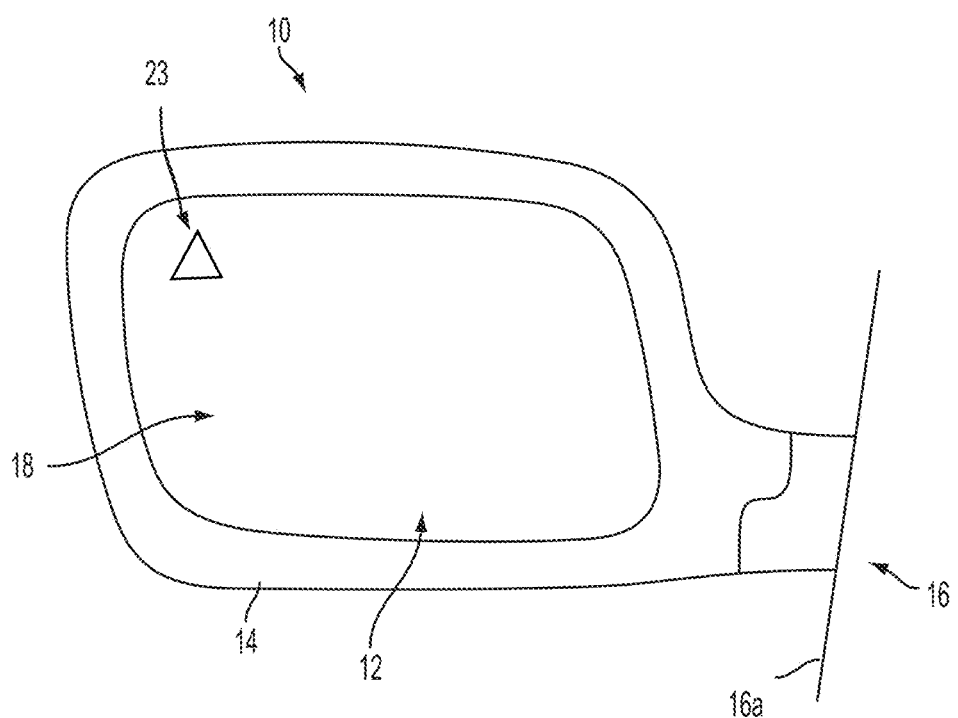
FIG. 1 is a view of an exterior mirror assembly with a blind zone indicator or indicator module in accordance with the present invention, shown as viewed in the direction of travel of the vehicle.
Figure 2:
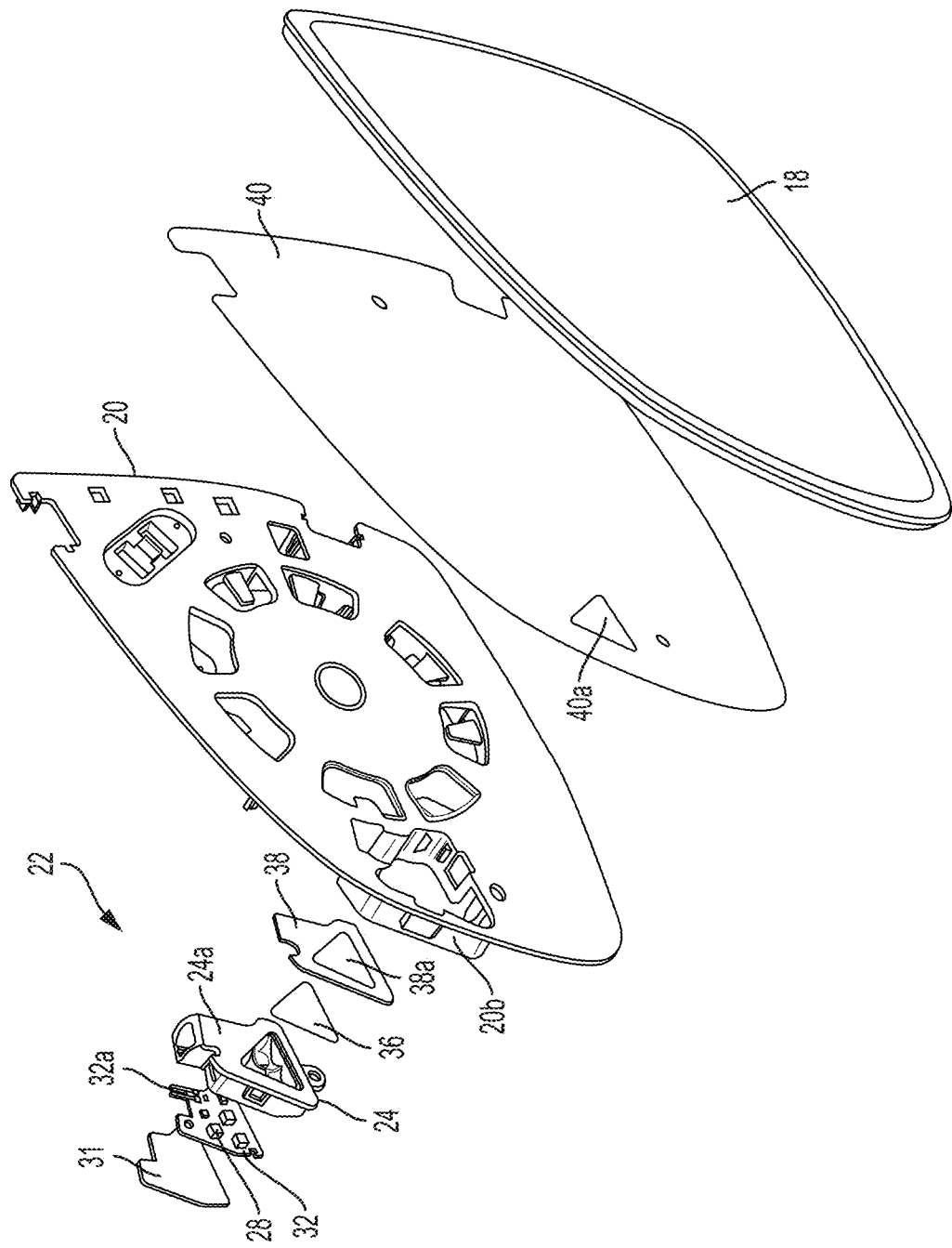
FIG. 2 is an exploded perspective view of an indicator module disposed at the back plate and heater pad and reflective element in accordance with the present invention.
Figure 3:
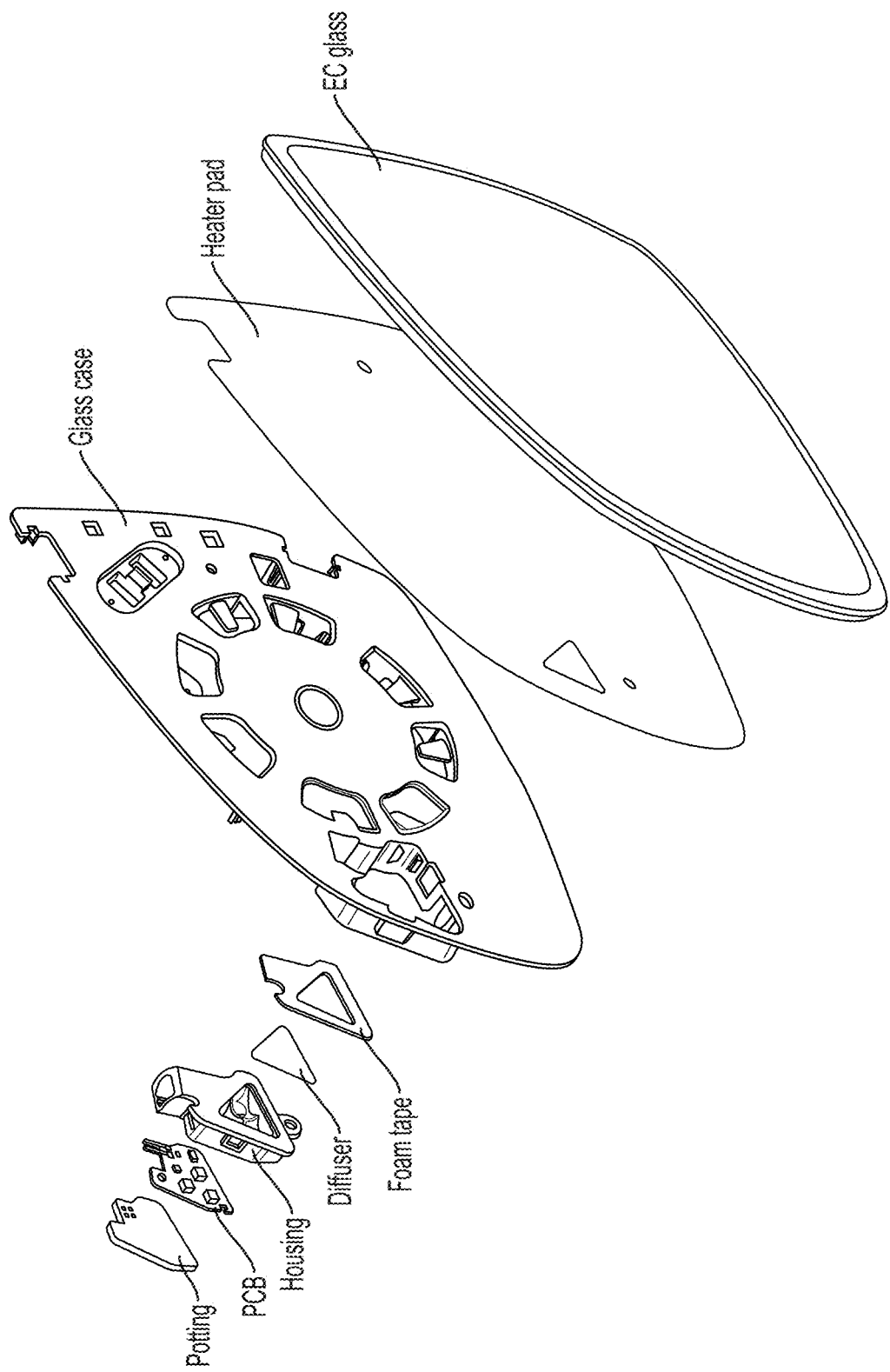
FIG. 3 is another exploded perspective view of the indicator module of the present invention, shown disposed at the back plate and heater pad and reflective element.
Figure 4:
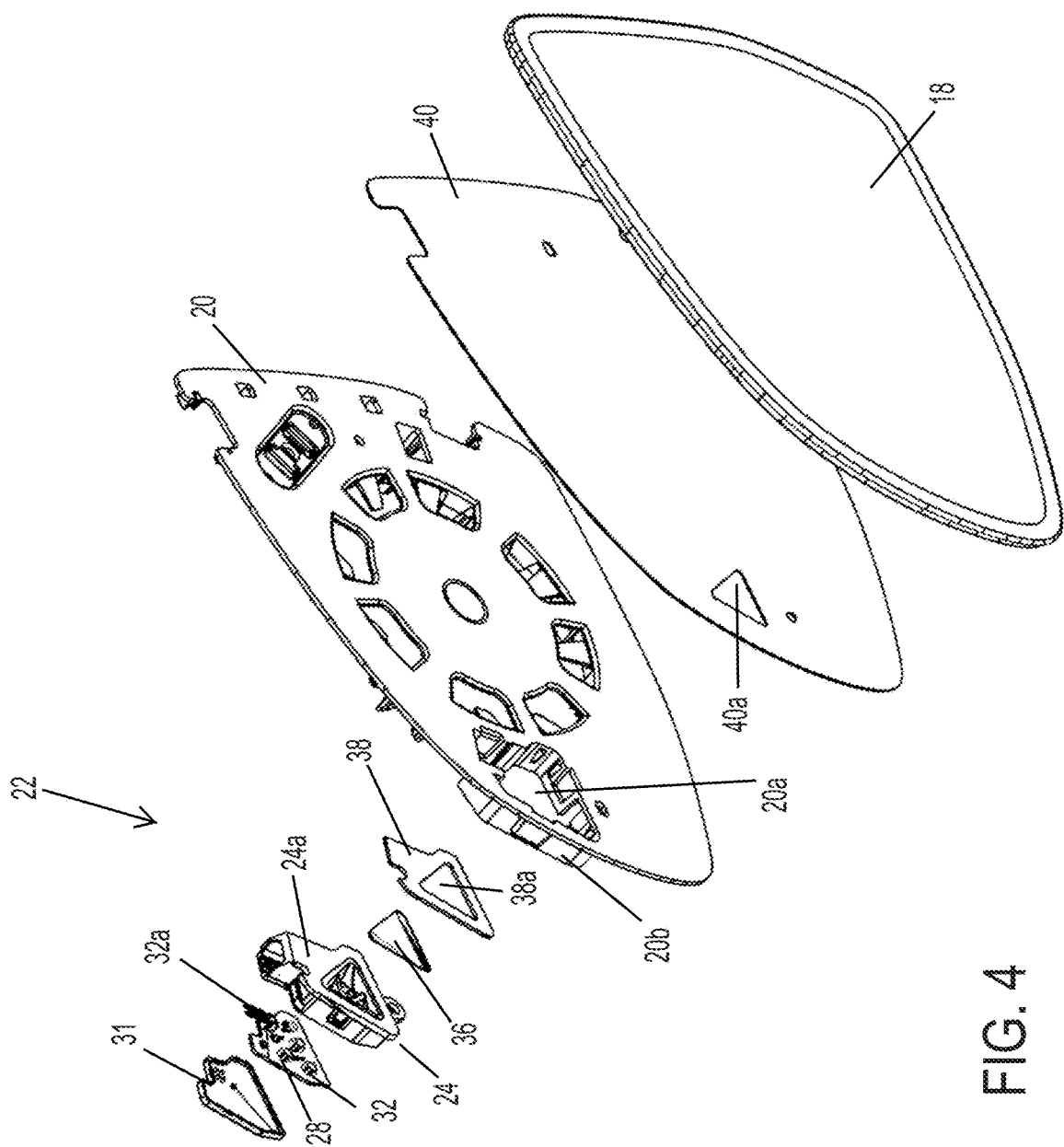
FIG. 4 is another exploded perspective view of the indicator module of the present invention, shown disposed at the back plate and heater pad and reflective element.
Figure 5:
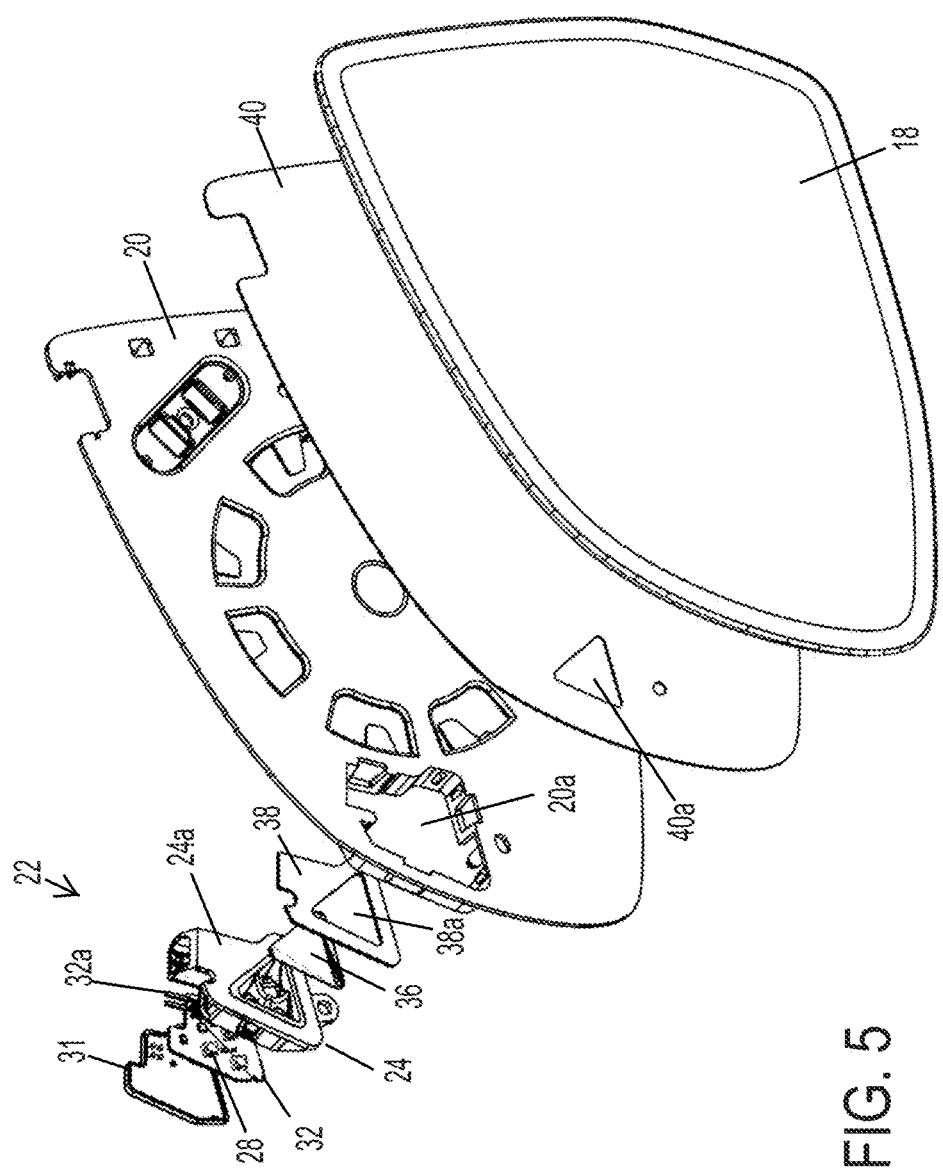
FIG. 5 is another exploded perspective view of the indicator module of the present invention, shown disposed at the back plate and heater pad and reflective element.
Figure 6:
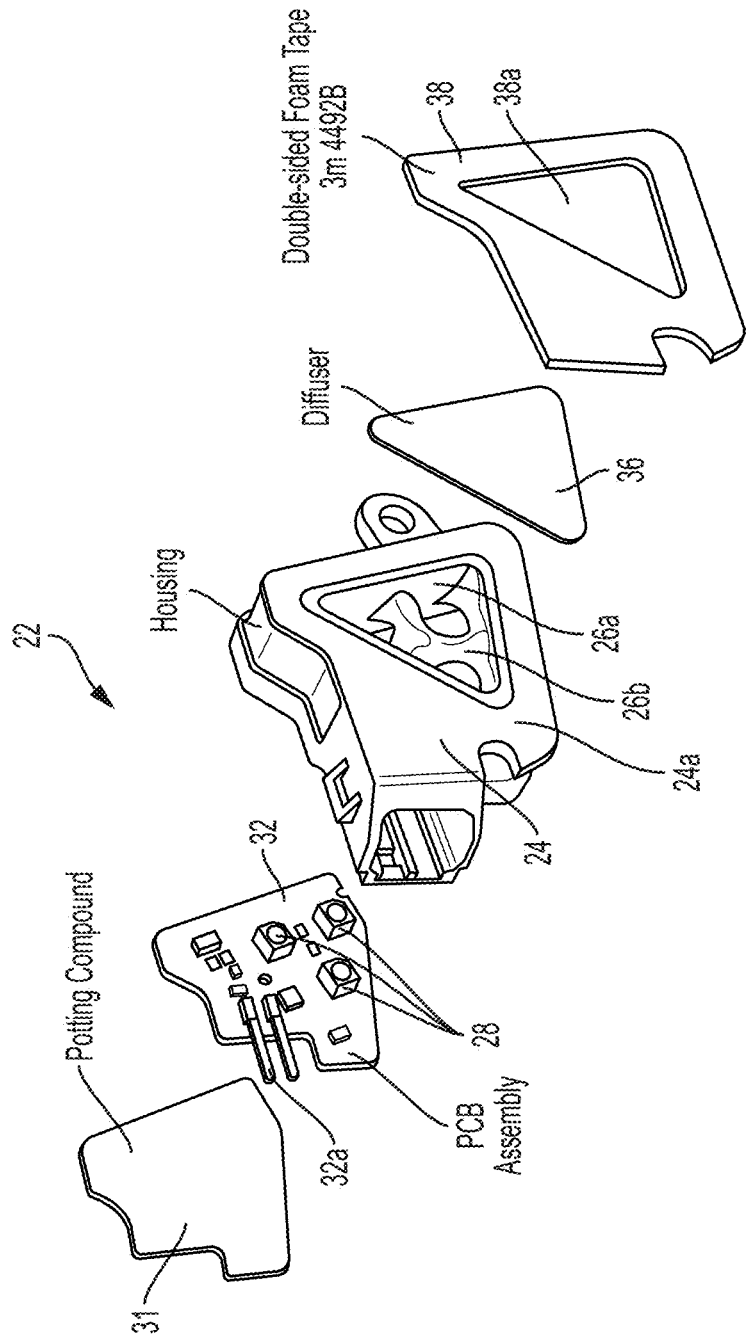
FIG. 6 is another exploded perspective view of the indicator module of the present invention.
Figure 7:
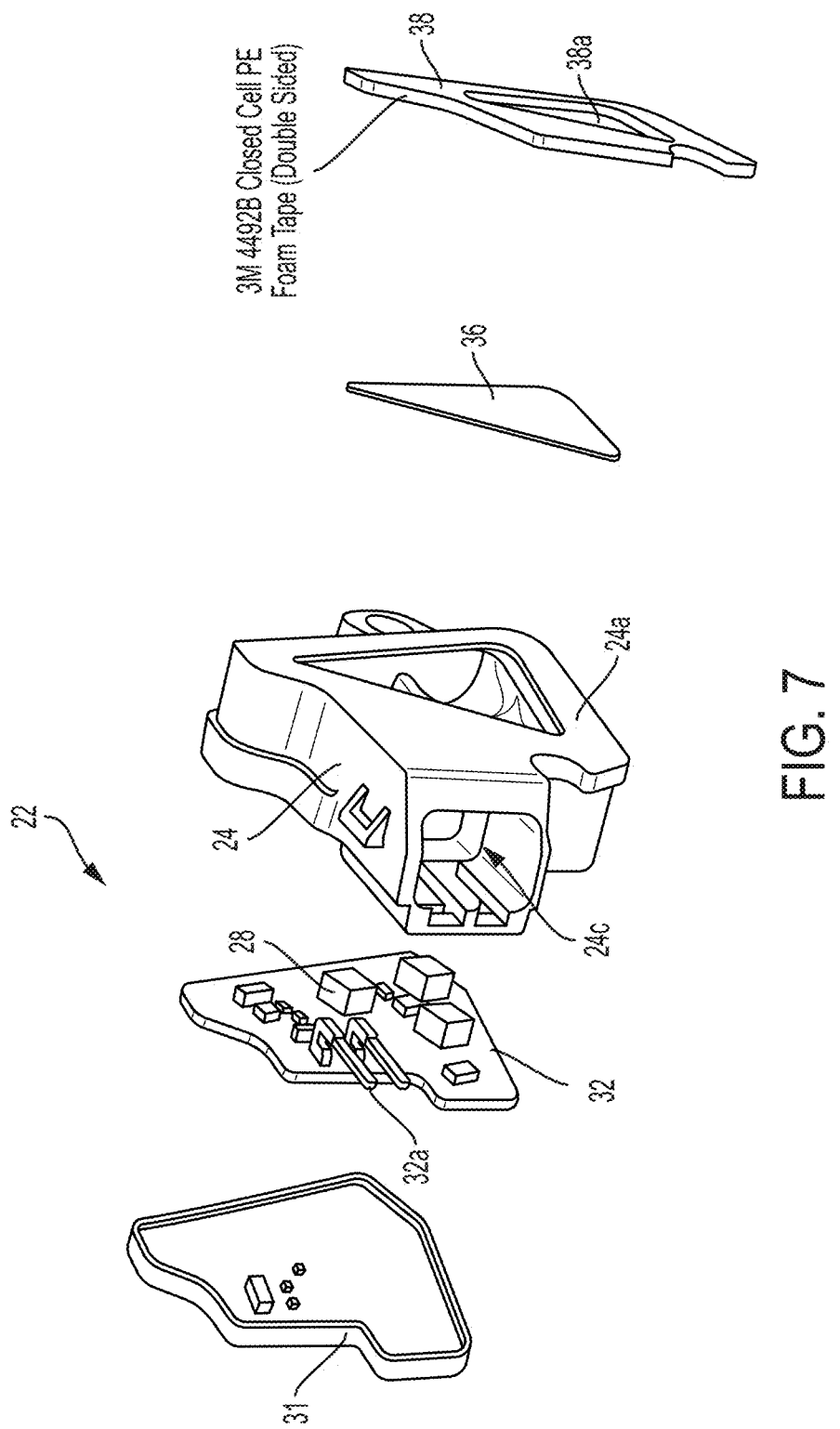
FIG. 7 is another exploded perspective view of the indicator module of the present invention.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side 16a of a host or subject vehicle 16. The mirror reflector sub-assembly 12 includes a mirror reflective element 18 and a mirror reflector carrier or back plate 20 (FIGS. 2-5) attached to or mounted to or adhered to a rear surface of the mirror reflective element 18. Mirror assembly 10 includes an indicator or display element or device or signal indication module 22 that is disposed at back plate 20 and behind reflective element 18, and that is operable to provide a display or indication 23 at the reflective element for viewing the display or indication through the mirror reflective element (such as via a window established, such as via ablation of the mirror reflector coating, at the reflective element or such as via viewing through a partially light transmissive and partially light reflective transflective mirror reflector of the reflective element).

Signal indication module 22 includes a housing 24 (that is received into or attached to an indicator receiving portion or mounting portion or structure of back plate 20 so as to be disposed generally at a rear surface of a planar portion of back plate 20) and an illumination source or indicator, such as one or more light emitting diodes (LEDs) or other suitable illumination source. In the illustrated embodiment, the light source comprises three light emitting diodes 28. Housing 24 of signal indication module 22 includes an internal structure 26 having an inner reflective surface 26a that is formed to angle or reflect the light emitted by the light emitting diodes 28 (disposed at respective apertures or holes 26b formed through the internal structure 26), such that light emitted by the light emitting diodes, when activated or energized or powered, is directed generally towards and is principally viewed by the driver of the vehicle. The signal indicator module may utilize aspects of the modules or units described in U.S. Publication No. US-2016-0078768, which is hereby incorporated herein by reference in its entirety.

In the illustrated embodiment, the signal indication module 22 comprises a blind zone indicator for an object detection in a blind spot detection system or LCA system (with the indicator module being angled and operated to provide a signal that is principally viewable by the driver of the vehicle). Optionally, the indicator module may also or otherwise include a display device or indicator for a turn signal indicator or signal indication module or other indicator device. The blind zone or signal indicator assembly or indicator module of the present invention may utilize aspects of the indicators described in U.S. Pat. Nos. 8,786,704; 8,058,977; 7,944,371; 7,581,859; 7,038,577; 6,882,287; 6,198,409; 5,929,786 and/or 5,786,772, and/or International Publication Nos. WO 2007/005942 and/or WO 2006/124682, which are all hereby incorporated herein by reference in their entireties.

As shown in FIGS. 2-10, indicator module 22 includes housing 24 that is open at the front and that has a front or attaching surface 24a that is generally planar and that is configured to be received through the aperture 20a in the back plate 20. In the illustrated embodiment, a connector portion or receptacle 24c of the housing 24 also provides a portion of the generally planar attaching surface. The back plate aperture is formed to receive the triangular shaped light reflecting portion of the housing and the connector portion of the housing therein. An adhesive tape or element or foam tape element 38 is shaped to correspond with the shape of the front surface 24a and has an aperture 38a formed therethrough that corresponds with the opening of the front portion 24a of the housing and that corresponds with a diffuser element 36. The tape 38 is configured to be adhered to the rear surface of a heater pad 40 (with the aperture 38a corresponding with an aperture 40a of the heater pad) and to be adhered to the front surface 24a of the housing 24 (including around the triangular-shaped aperture and at the connector portion) to attach the module 22 at the heater pad 40, which is adhered to the rear surface of the reflective element 18.

The adhesive tape 38 may comprise any suitable adhesive or foam tape that may conform to the front surface of the module housing and to the heater pad and/or rear surface of the reflective element (such as to a curved rear surface for a non-planar reflective element or the like) while sealing and adhering the module housing at the rear of the reflective element. For example, the foam tape may comprise a double coated polyethylene foam tape of the types commercially available from 3M of St. Paul, Minnesota, which provide a conformable closed cell foam with a rubber adhesive or a high strength acrylic adhesive, such as 3M's 4462W, 4462B, 4466W, 4466B, 4492G, 4492W, 4492B, 4496W or 4496B double coated polyethylene foam tapes or the like. The foam tape may comprise a dark colored tape (such as black) to limit or substantially preclude passage of light therethrough.

The diffuser element 36 is shaped to attach at the front surface of the housing 24 and/or at the rear surface of the reflective element or at the rear surface of the heater pad, so as to be disposed at the aperture of the foam tape, whereby light emitted by the LEDs 28 is directed through the diffuser element 36 and generally towards the driver of the vehicle. The diffuser element 36 may comprise any suitable diffuser element. For example, the diffuser element may comprise a diffuser film or element of the types commercially available from Keiwa Inc. of Tokyo Japan, such as, for example, Keiwa's PBS-series of diffuser films or the like. The diffuser element thus is at least partially transmissive of visible light and also functions as a cover element at the front surface of the housing 24 to close the opening of the housing circumscribed by the attaching surface.

The adhesive tape comprises a cut out or shaped tape element that adhesively attaches at the attaching or front surface of the housing and at the heater pad or reflective element. The adhesive tape may comprise a double sided tape element, such as a pressure sensitive adhesive (PSA) element, where a film is peeled off one or both sides of the adhesive tape to expose the adhesive when attaching/adhering the tape element to the front surface of the housing and/or the rear surface of the heater pad or mirror reflective element. The indicator module may, when shipped, have the adhesive element attached at the front or attaching surface of the housing, whereby, when assembling the mirror reflective element sub-assembly, an operator may peel the film off the front surface of the adhesive tape element at the front of the housing to expose the adhesive and may insert the module into the aperture of the mirror back plate and press the module against the rear surface of the heater pad or the rear surface of the mirror reflective element to attach the module at the rear of the reflective element. Optionally, the front surface of the adhesive tape element may adhesively attach at the rear surface of the mirror back plate (such as for applications where the aperture through the back plate generally corresponds with the triangular-shaped (or other shape) opening of the adhesive tape element and/or front opening of the housing and/or aperture through the heater pad and/or the like), whereby the attaching surface of the housing and the adhesive tape element at least partially circumscribe the aperture formed through the mirror back plate.

The adhesive tape may comprise a foam tape that has a crush of at least about 0.25 mm, preferably about 0.5 mm, which aids in the assembly of the module at the back plate due to over-traveling of the module when snapping it to the back plate. The foam tape acts as a seal around the periphery of the molded housing or white diffuser, and functions as a light blocker to limit or prevent light leakage behind the mirror reflective element. The foam tape may be applied at the heater pad or at the back plate or at the module, depending on the particular application of the module and preferred assembly processes.

The cut out triangle-shaped aperture in the adhesive element is about 1.5 times larger than an ablated triangle formed through the mirror reflector of the reflective element. This allows the ablated triangle at the glass and the back plate to be slightly mis-located and not have winking (black tape visible from the glass side). The tape diffuser works best when it is disposed subflush to the molded housing or diffuser (i.e., is received in a recess at the front portion of the housing). Such an arrangement provides the least amount of light leakage at the diffuser element.

Signal indication module 22 includes a circuit element 32, such as a printed circuit board or the like (such as a rigid or flexible circuit board or element), with the illumination sources or LEDs 28 disposed thereat (such as surface mounted or otherwise disposed LEDs or other suitable or equivalent light source), although more illumination sources or LEDs may be provided while remaining within the spirit and scope of the present invention. The circuit element or PCB includes circuitry including resistors and/or voltage reducing circuits and/or ballast circuitry and/or DC to DC converters and/or the like (such as by utilizing aspects of the circuits and light sources described in U.S. Pat. No. 7,195,381, which is hereby incorporated herein by reference in its entirety). Circuit element 32 is attachable at or positioned at a rear portion 24b of the housing 24 (such as received at a pocket or receiving portion formed at the rear portion of the housing 24), whereby the illumination sources 28 are located at the rear portion of the housing and at an opposite end of the housing from the reflective element 18. When the circuit element 32 is disposed in or received at the rear of the housing 24, a potting element or material 31 may be disposed over the circuit element to seal the circuit element in the housing.

The illumination sources or LEDs 28 are disposed or arranged at the circuit element such that the LEDs 28 are disposed at respective apertures or holes 26b formed through the internal structure 26 of the housing 24. For example, and such as can be seen with reference to FIG. 6, and 14-18, the LEDs may comprise three triangularly arranged LEDs and the holes 26b may be similarly triangularly arranged to accommodate the respective LEDs.

Thus, when the indicator module is attached at the reflective element (such as via the foam tape), the indicator module circuit element or PCB is parallel to the mirror reflective element, which provides enhanced packaging. With such a configuration, the lower limit of the thickness of the module is actually driven by the waterproof connector. When attached at the rear of the reflective element, the module is aimed approximately 30 degrees from normal towards the inside of the vehicle. The ablation percentage on the glass is between about 85 percent transmissive and about 40 percent transmissive to provide a desired or appropriate balance between hiding the diffuser and letting enough light through for an efficient system. For example, the minimum light levels emitted by the module and viewable by the driver of the vehicle when operated during daytime lighting conditions may be at least about 1,500 Nits or cd/m$^2$, or at least about 6,000 Nits or cd/m$^2$, depending on the particular application of the indicator module. The circuit element may use a transistor based constant current circuit in order to have the same output for different voltages.

When used and operated in an exterior rearview mirror assembly on a vehicle, the light intensity of the illuminated icon or diffuser element, as seen by a driver of the equipped vehicle viewing the illuminated icon at the reflective element, is varied (such as by pulse width modulation of the voltage applied to the light source or sources of signal indication module 22) in accordance with the ambient light level (such as detected by the likes of a photodetector or photosensor) that the equipped vehicle is operating in. Thus, for example, as daytime lighting transitions to dusk and then to night, the display intensity can either progressively/continually reduce or may stepwise reduce as ambient lighting decreases. Thus, for example, when the equipped vehicle is operating on a dark rural road at night, the display intensity may be less than about 1,000 Nits, and preferably less than about 800 Nits and more preferably less than about 500 Nits or thereabouts, so as to limit or avoid glaring of the night-adapted vision of the driver.

Figure 22:
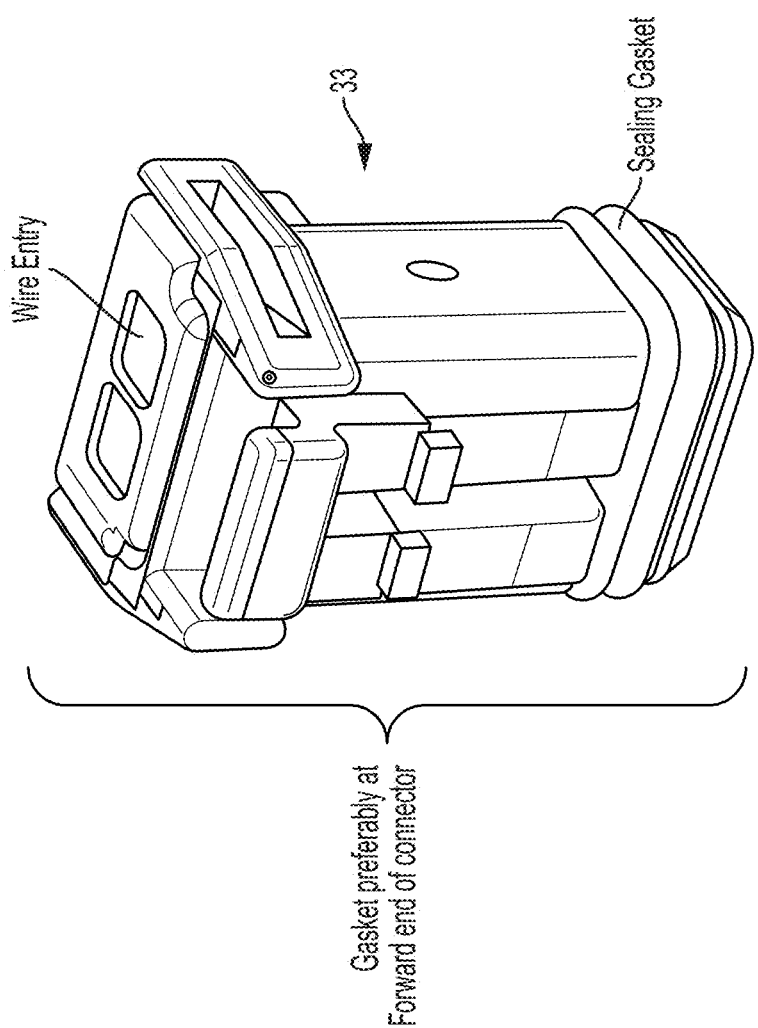
FIG. 22 is a perspective view of a connector suitable for use with the indicator module of the present invention.

Circuit element 32 includes electrical terminals or connectors 32a that are in electrical or conductive communication with illumination sources 28 and that electrically connect the circuitry and light sources to electrical power or electrical control at the mirror assembly when the signal indication module is attached to the back plate and installed at the mirror casing. As can be seen with reference to FIG. 7, the terminals or connectors 32a extend from the circuit element 32 and, when the circuit element is received in the housing, are disposed at or in a sealed connector receptacle 24c of the housing 24. As can be seen with reference to FIGS. 14 and 15, the receiving portion or rear portion 24b of the housing 24 is configured to receive the circuit element 32 therein, whereby the terminals 32a are inserted through apertures 24d (FIG. 14) at the housing wall between the receiving portion and the connector portion. Thus, when the circuit element 32 is disposed in the receiving portion, the circuit element can be angled as it is inserted into the receiving portion so that the terminals are inserted through the apertures 24d, whereby the circuit element may be pressed into place in the receiving portion and sealed or encased therein (such as via cover element 31 or the like. Optionally, connectors 32a connect to a mating connector 33 (FIG. 22), which is disposed at an opening or connector receptacle in housing 24 for electrical connection to a wire harness connector of the mirror assembly or vehicle to provide power and/or control to the signal indication module when the module is mounted to or attached to the back plate and installed at the mirror casing.

Figure 11:
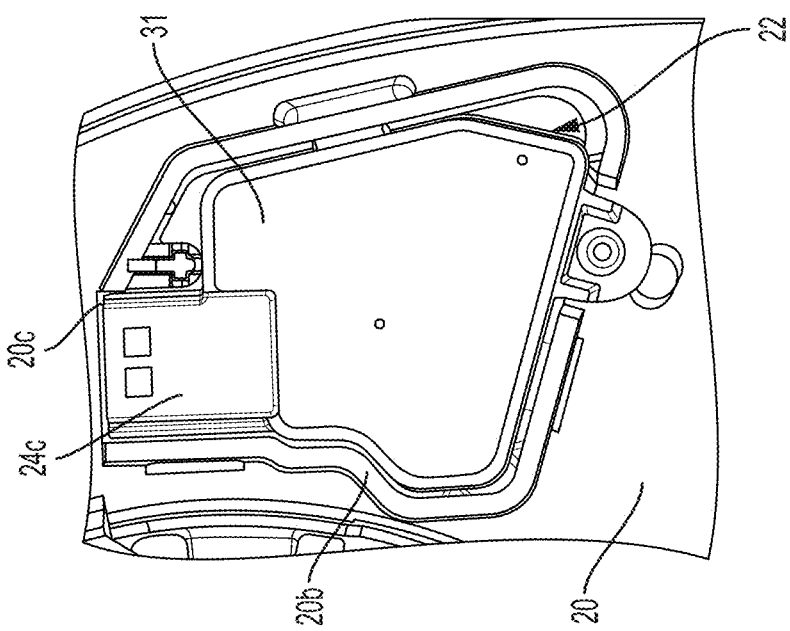
Figure 13:
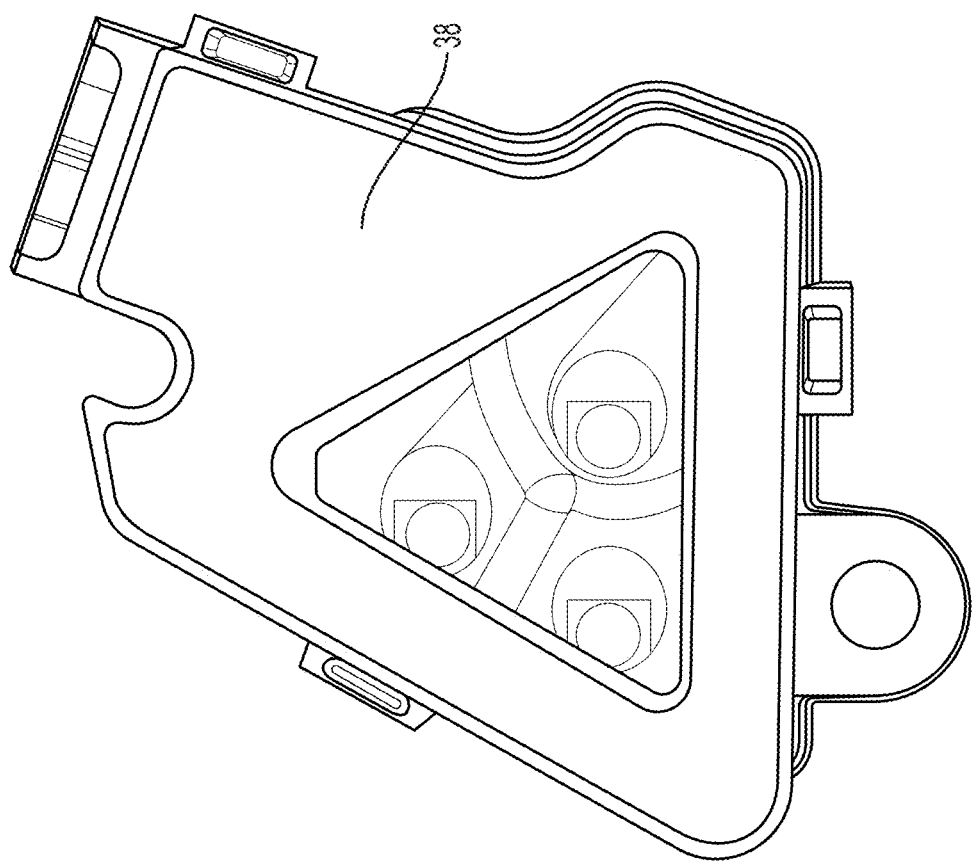
FIG. 13 is a front plan view of the indicator module of the present invention.
Figure 14:
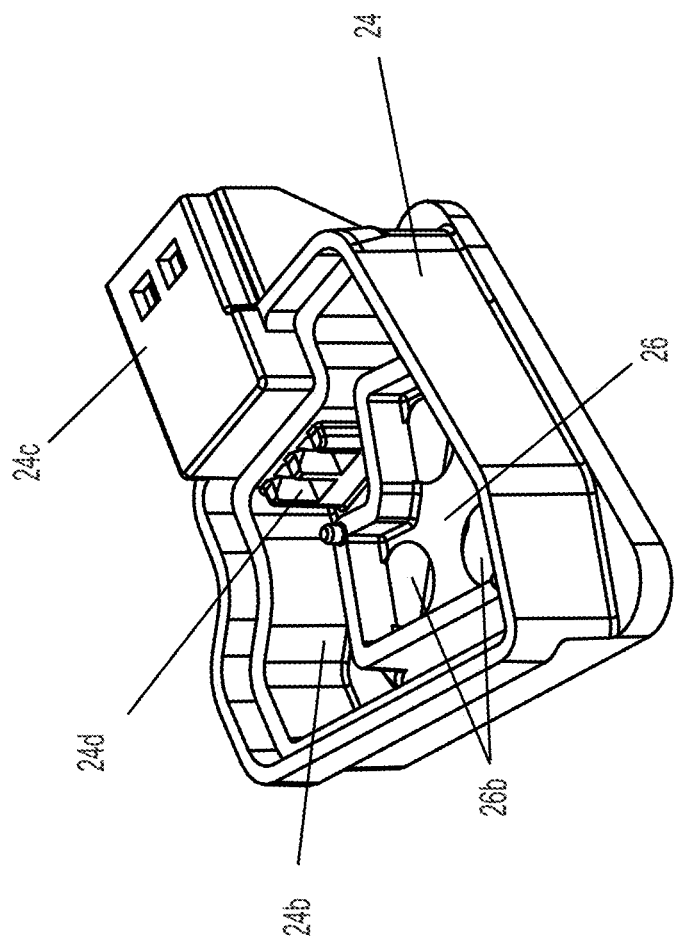
FIG. 14 is a perspective view of the indicator module of the present invention, shown without the rear cover and circuit board.
Figure 15:
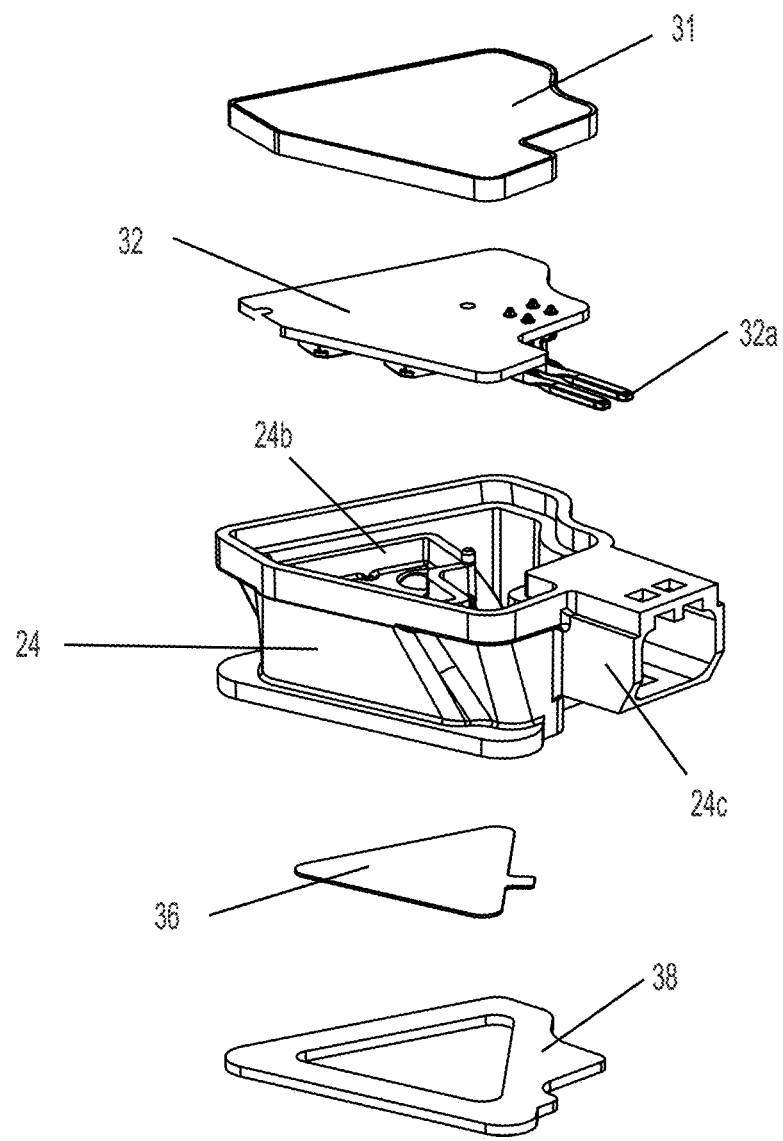
FIG. 15 is another exploded perspective view of the indicator module of the present invention.
Figure 18:
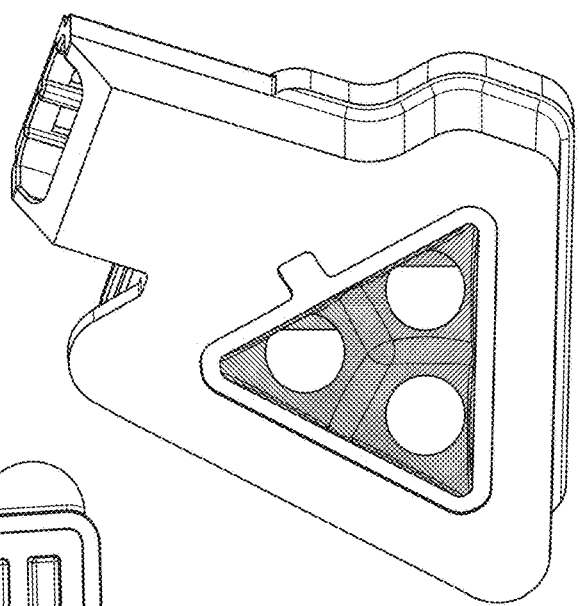
FIG. 18 is another perspective view of the indicator module of the present invention.
Figure 17:
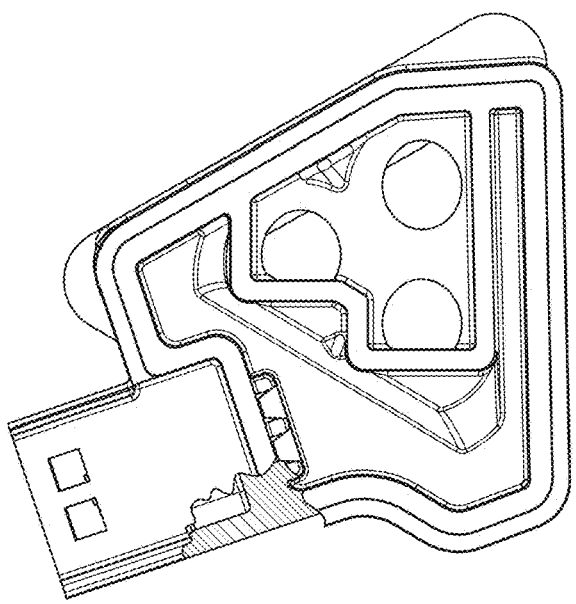
FIG. 17 is another perspective view and partial sectional view of the indicator module of the present invention.
Figure 16A:
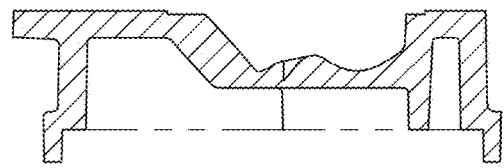
FIG. 16A is a sectional view of the indicator module taken along the line A-A in FIG. 16.
Figure 16:
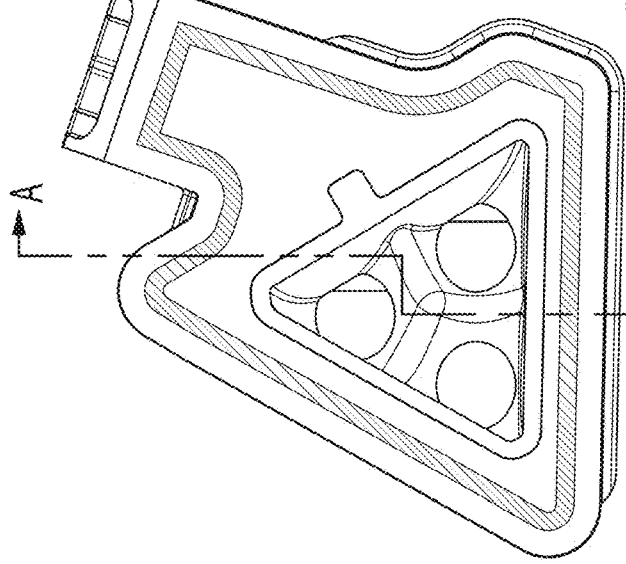
FIG. 16 is a perspective view of the indicator module of the present invention.
Figure 19B:
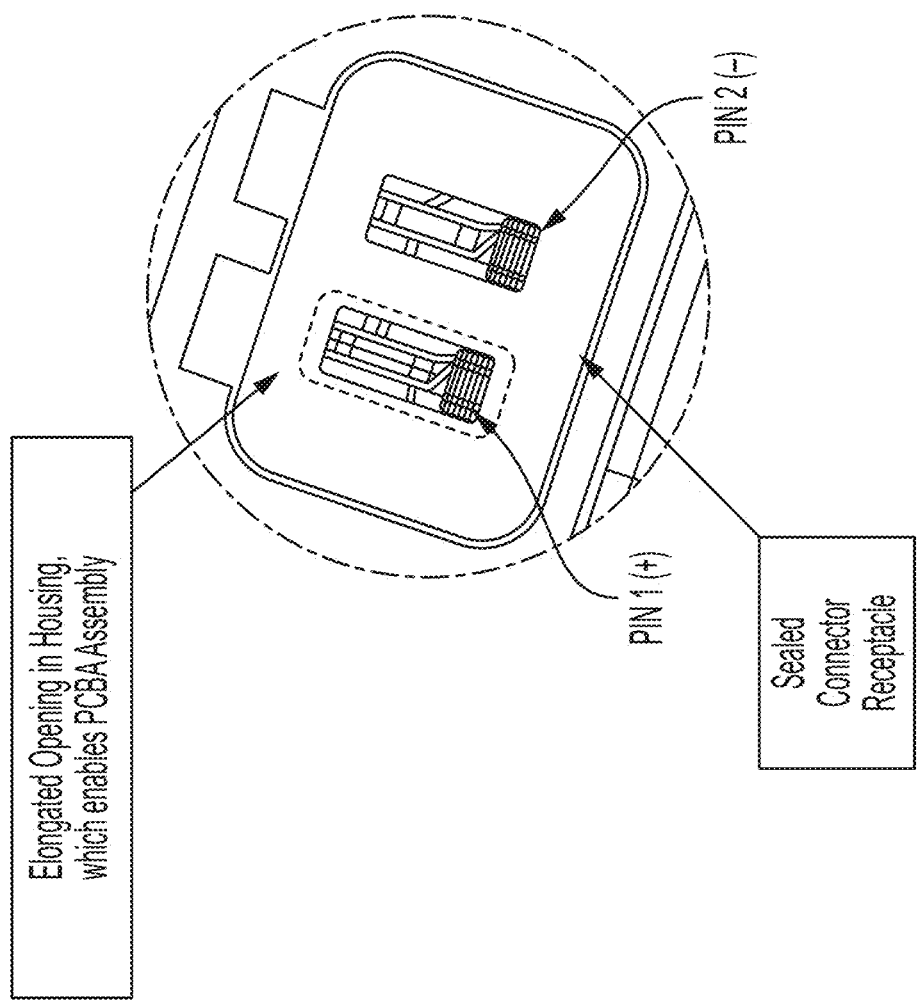
FIG. 19B is another enlarged end view of the connector of FIG. 19.
Figure 20:
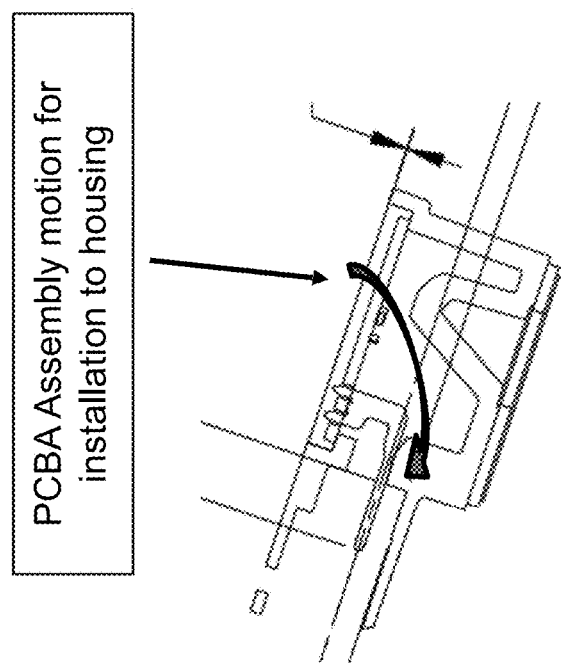
FIGS. 20 and 21 are sectional views of the indicator module of the present invention.
Figure 19C:
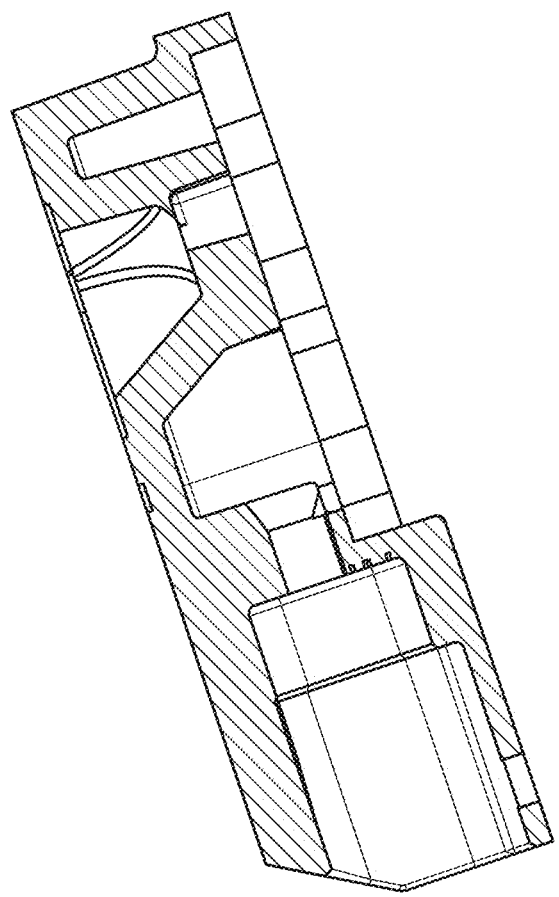
FIG. 19C is a sectional view of the indicator module taken along the line C-C in FIG. 19.
Figure 21:
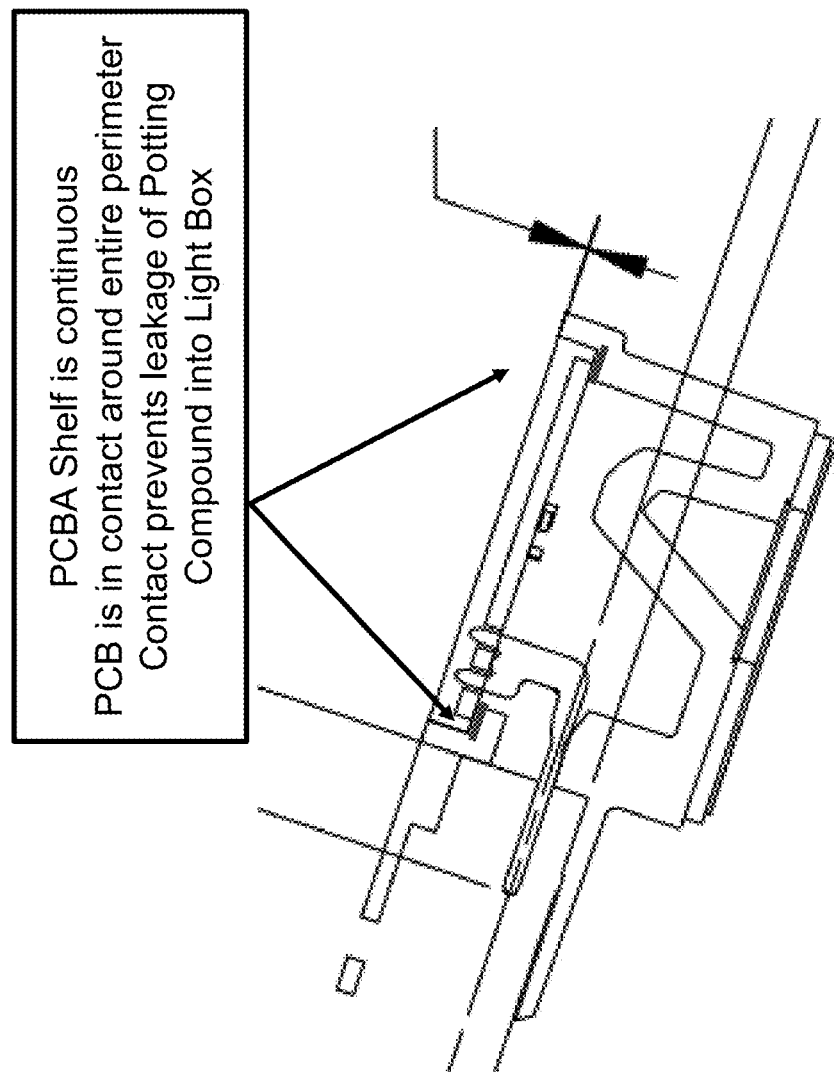

The mirror back plate 20 comprises structure 20b at least partially circumscribing said aperture 20a formed through the mirror back plate for receiving at least a portion of the housing 24 therein. The housing 24 is at least partially received in the structure of the mirror back plate, which is formed to receive the first portion and the connector portion of the housing at least partially therein. An outer end or wire harness connecting end of the connector portion of the housing is disposed at an opening 20c (see FIG. 11) in the structure 20b of the mirror back plate 20 to facilitate connection of the connector portion 24c with the connector of the wire harness of the exterior rearview mirror assembly to electrically connect the wire harness to circuitry of the circuit board.

Signal indication module 22 includes a diffuser element 36 that is disposed at a forward end region or portion 24a of housing 24 so as to be disposed at the rear of the reflective element when the signal indication module 22 is attached at the back plate 20 and heater pad and rear surface of the reflective element. Optionally, the walls or surfaces of the inner surface or internal structure 26 of housing 24 may comprise highly specularly and/or diffusely light reflecting inner surfaces so as to enhance diffuse reflection of incident light to enhance the intensity of illumination that exits the indicator module through the indicia element. For example, the housing wall may be molded of a white plastic material or resin, such as an ABS or an ABS/polycarbonate polymeric resin material or the like. The housing may comprise a polymeric housing molded via a unitary injection molding process.

The diffuser cover or film or element 36 is disposed at the front (or rear) of the module to diffuse the light emitted by the illumination sources 28 to provide more uniform illumination (when the illumination sources are activated) as viewed by the driver of the vehicle. The diffuser element 36 may be attached or adhered at the front end portion or surface of the housing 24 (and the diffuser element may also or otherwise be adhered to the rear of the reflective element when the indicator module is attached at the back plate).

Illumination sources 28 are energized to direct or emit illumination along the housing so that the indicator/light is viewable through the reflective element. The illumination sources 28 may comprise any suitable illumination source or light source. For example, the illumination sources may comprise one or more light emitting diodes (LEDs) or organic light emitting diodes (OLEDs) or the like, or may comprise one or more power LEDs, such as of the types described in U.S. Pat. No. 7,195,381, which is hereby incorporated herein by reference in its entirety, or may comprise a LUXEON® LED available from LUMILEDS™ or other suitable light source.

Figure 23:
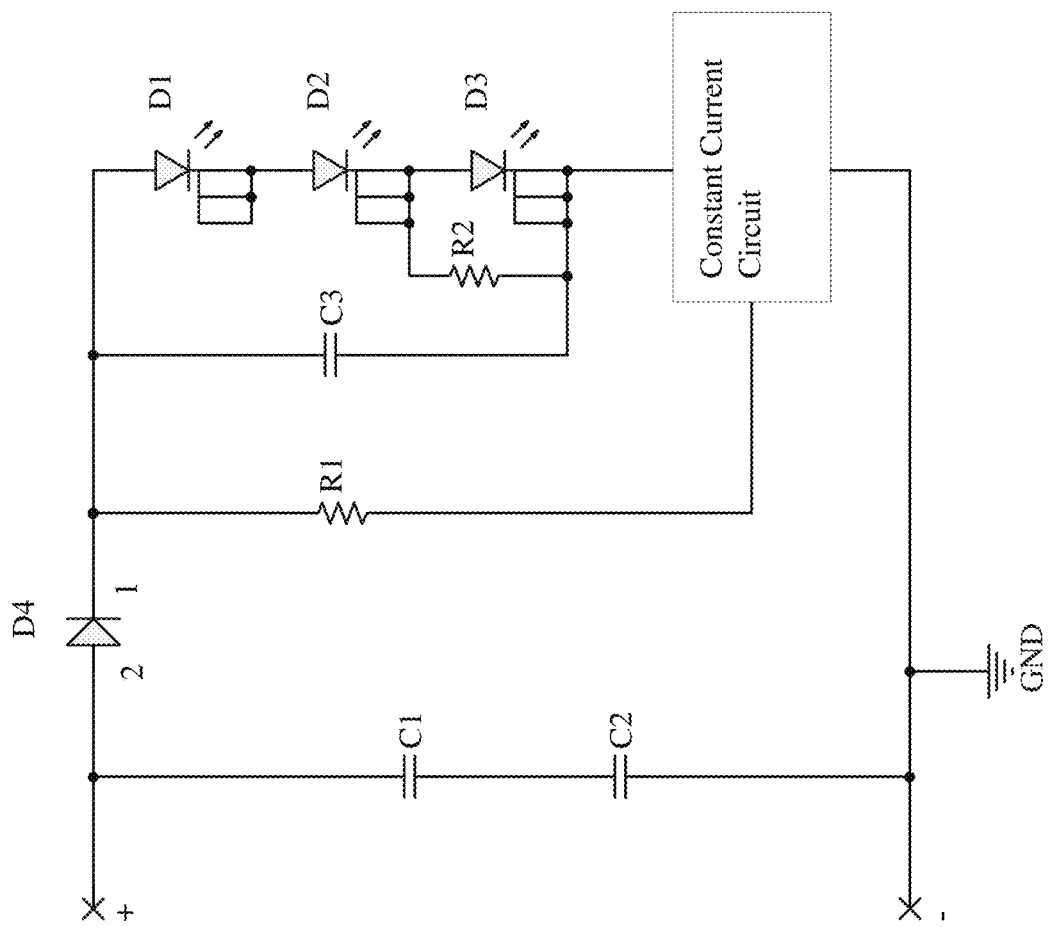
FIG. 23 is an electrical schematic of a circuit for controlling the light emitting diodes of the indicator module of the present invention, without a constant current circuit.
Figure 24:
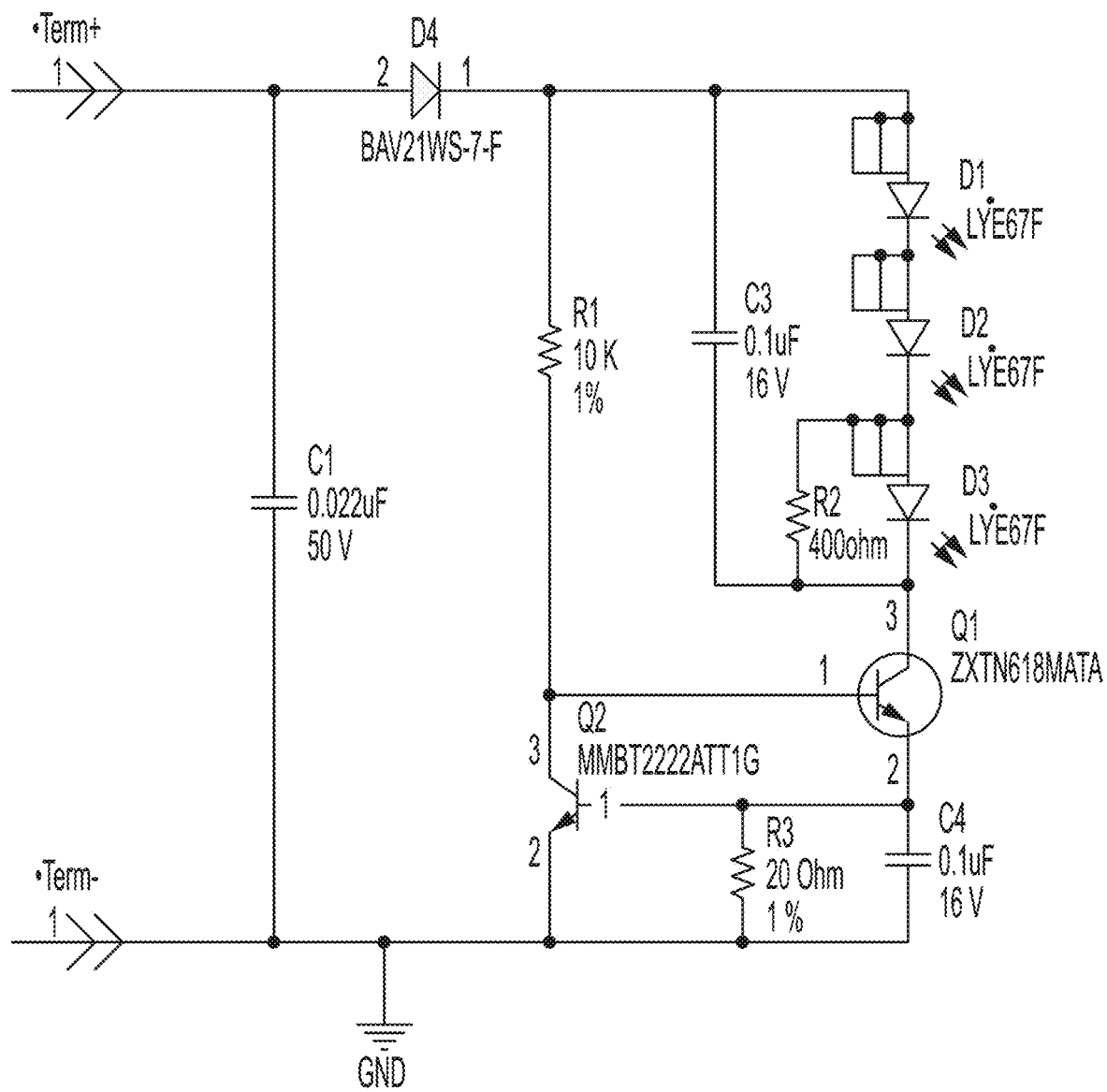
FIG. 24 is an electrical schematic of another circuit for controlling the light emitting diodes of the indicator module of the present invention.
Figure 25:
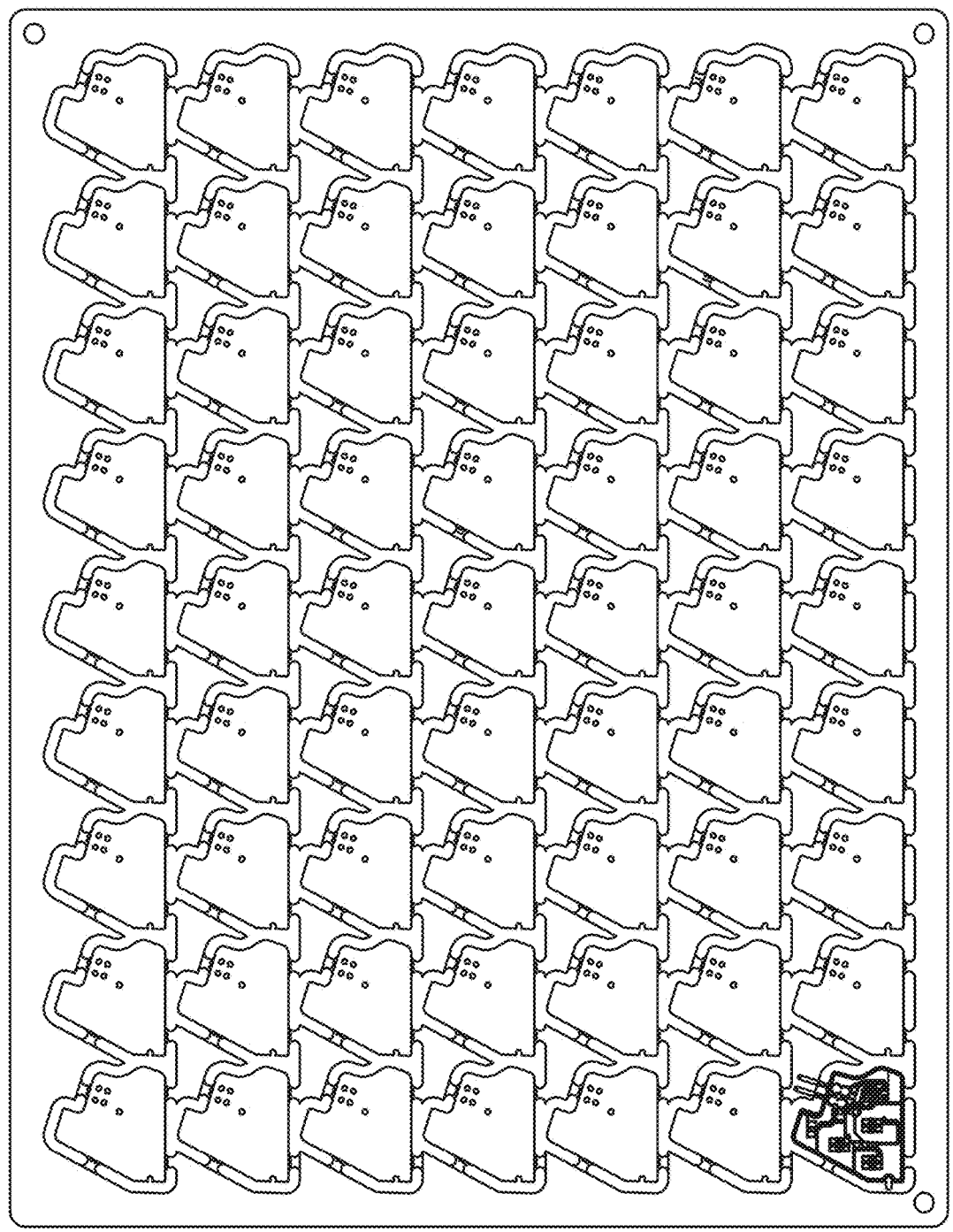
FIG. 25 is a plan view of a plurality of circuit boards for use with the indicator module of the present invention.
Figure 26:
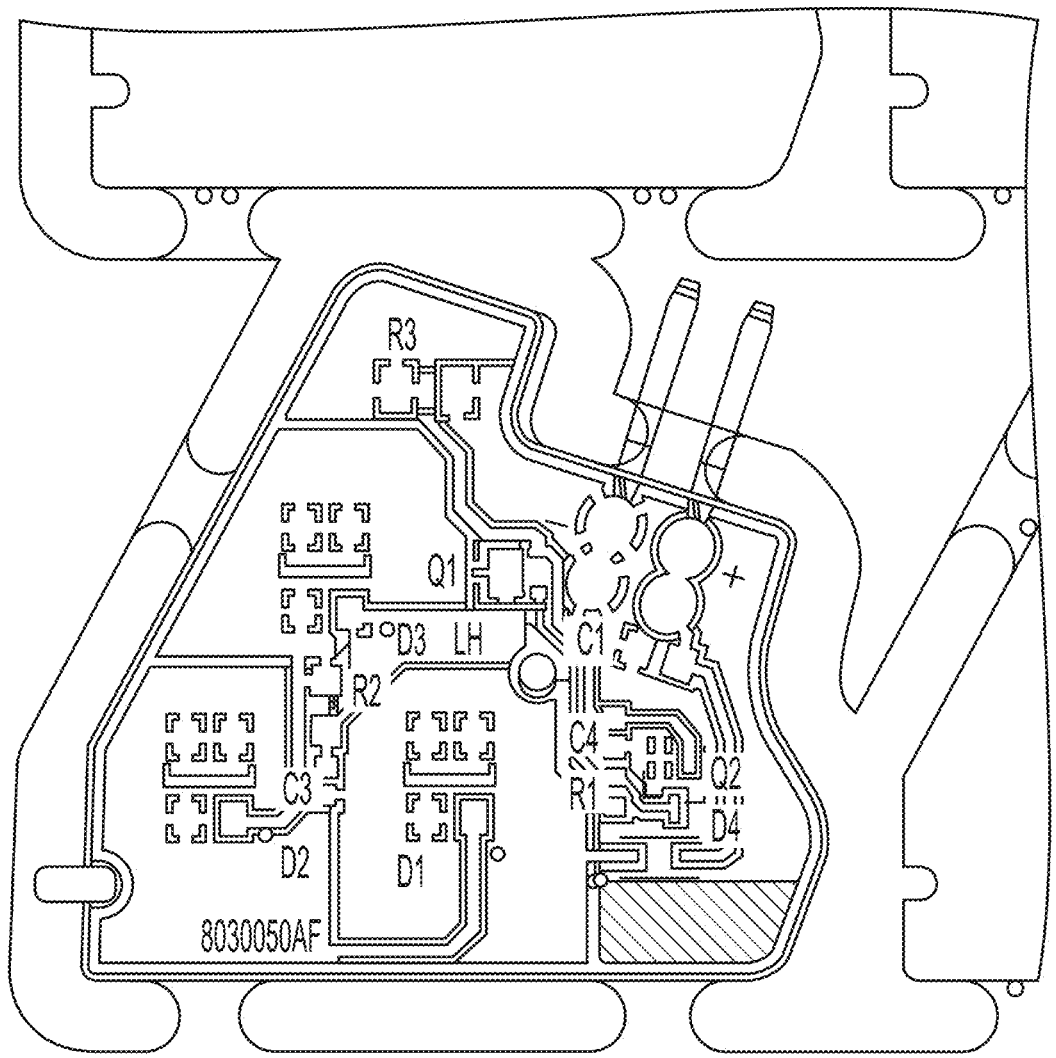
FIG. 26 is an enlarged plan view of a finished circuit board of FIG. 25.

The illumination sources 28 may be controlled or operated via any suitable circuitry and/or control. For example, a circuit may be operable to power the LEDs with a constant current circuit (such as shown in FIGS. 23 and 24). When powered, the LEDs may provide up to about 11,000 nits minimum average brightness at nominal supply voltage (such as between about 9 and 16 volts DC, such as about 13.5 Volts DC), with a generally uniform illumination. The LEDs may emit colored light or white light, depending on the particular application, and may operate at a maximum current of about 100 mA and may be operable at temperatures between about −30 degrees C. and +65 degrees C.

Optionally, a heater pad 40 (FIGS. 2-5 and 10) may be provided at the rear surface of the glass substrate of the reflective element and between the backing portion of the back plate and the reflective element to provide an anti-fogging of de-fogging feature to the exterior mirror assembly (such as by utilizing aspects of the heater elements or pads described in U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. Pat. No. 7,400,435) for electrically connecting the heater pad and/or indicator module and/or display element (or other suitable electrical connectors may be utilized, such as electrical leads or wire harnesses or pigtails or other separate connectors or cables or the like). The heater pad may include a hole or opening or aperture therethrough (or optionally a window or transparent or translucent or diffuse portion of the heater pad, such as a clear or diffusing transparent polyester flexible plastic film or element) that generally corresponds to the aperture of the back plate when the heater pad is attached to the rear surface of the glass substrate of the reflective element (such as via an adhesive such as a pressure sensitive adhesive) and when the back plate is attached to the rear surface of the heater pad. Optionally, and desirably, the heater pad may include an adhesive layer (such as a pressure sensitive adhesive layer) at its rear surface for adhering the back plate to the heater pad and thus to the rear surface of the glass substrate of the reflective element.

For applications where the indicator module attaches at the rear of the heater pad (such that the portion of the heater pad that circumscribes the aperture through the heater pad is contacted by the foam tape element), the aperture through the heater pad may generally correspond with the opening of the housing that is circumscribed by the attaching surface of the housing. For example, and such as shown in FIGS. 2-5, the aperture 40a through the heater pad 40 is smaller than the foot print of the attaching surface 24a of the housing 24 (and the aperture 40a generally corresponds with the aperture 38a of the foam tape element 38), such that the attaching surface 24a attaches to one side of the foam tape element 38 and the other side of the foam tape element 38 attaches to the rear of the heater pad 40. Optionally, for applications where the indicator module attaches at the rear surface of the mirror reflective element, the aperture or hole through the heater pad is at least as large or larger than the foot print of the attaching surface of the housing (which is about the same as or slightly smaller than the aperture through the mirror back plate) to provide clearance for the attaching surface of the housing to pass through the back plate aperture and through the aperture of the heater pad to attach at the rear surface of the mirror reflective element via the tape element.

The inner surface of the housing may be polished to enhance reflection of the emitted light to enhance viewability of the icon through the mirror reflective element. Optionally, the polishing or surface finish of the diffuser element may be selected to provide the desired degree of reflectivity and light emittance by the indicator module. Optionally, the indicator module may be operable to provide a desired brightness or intensity of illumination and the desired directionality. The relative brightness of the LEDs may be balanced with current shunts and the LEDs may be driven with less current which may help to meet light reduction specifications.

The back plate and/or signal indication module may be formed to provide a desired shape for viewing of the light passing through the reflective element or the mirror reflective element preferably includes one or more iconistic display areas or masks so that the illumination is viewable and discernible at the reflective element by the desired or targeted viewer. The mirror assembly thus may provide an iconistic display for an object detection/LCA system and/or an iconistic display for a turn signal indication, and/or may provide other displays or illumination devices, without affecting the scope of the present invention.

Figure 9:
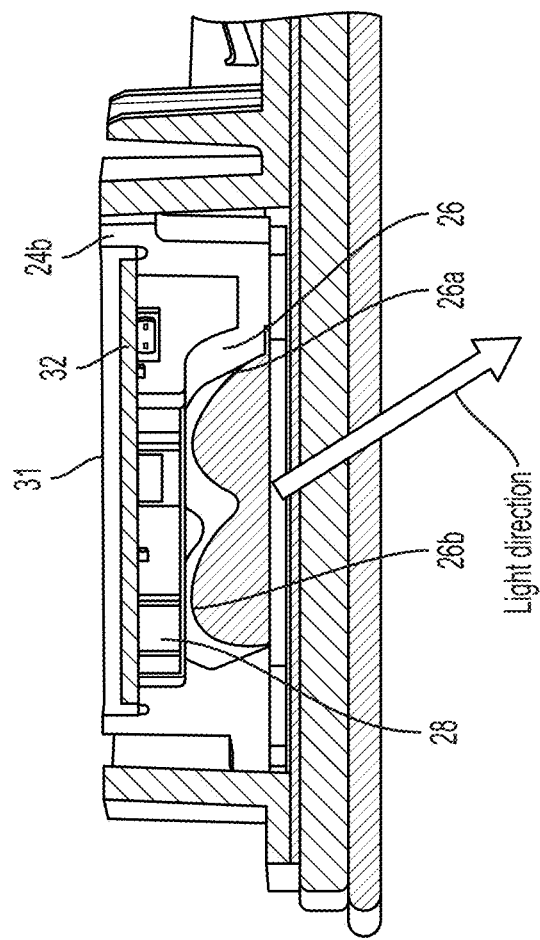
FIG. 9 is an enlarged sectional view of the indicator module and back plate and reflective element of the present invention.
Figure 8:
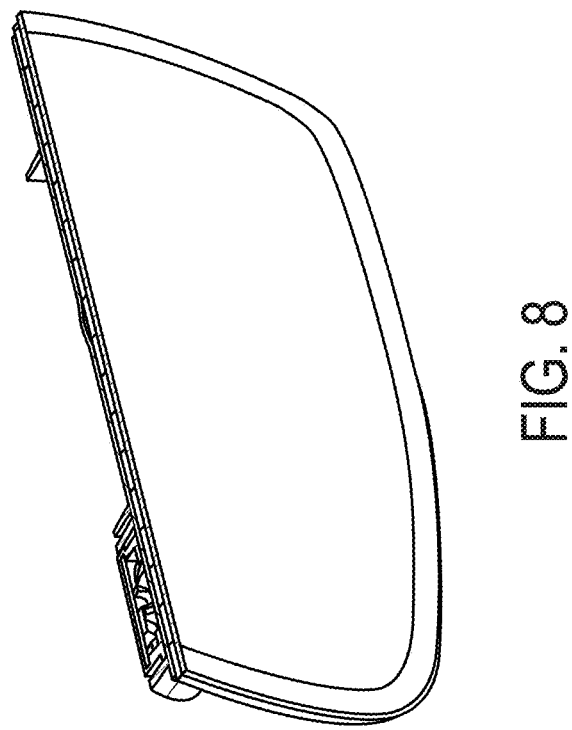
FIG. 8 is a perspective and partial sectional view of the indicator module of the present invention at the back plate and reflective element.
Figure 10:
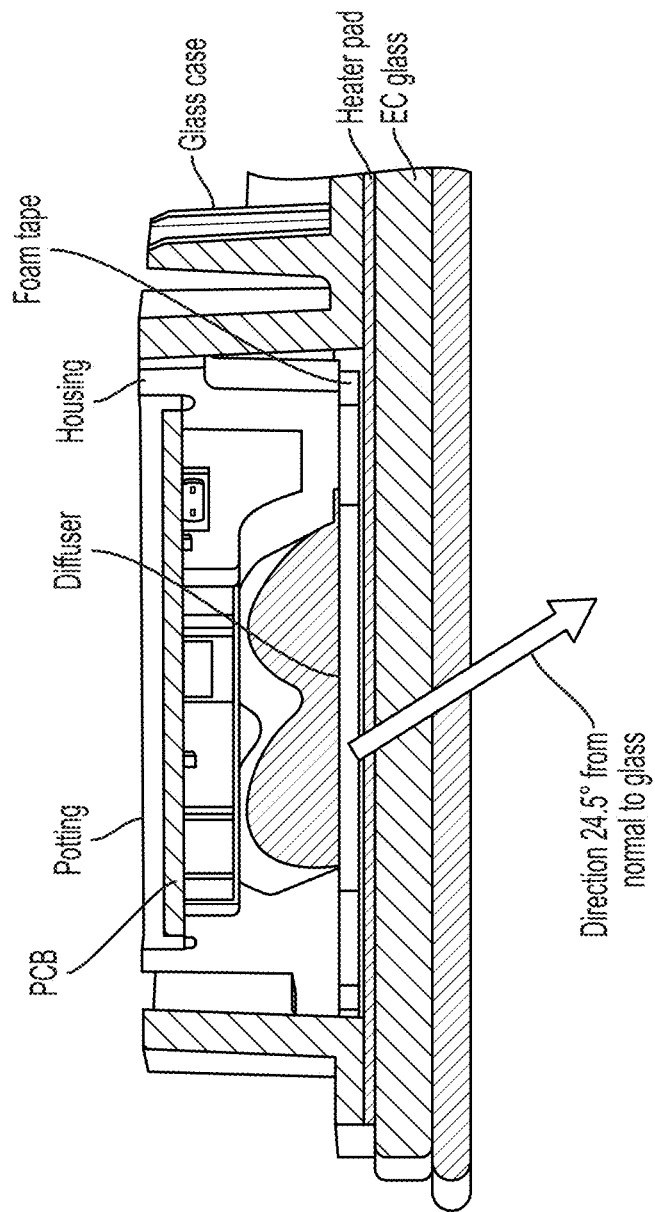
FIG. 10 is another enlarged sectional view of the indicator module and back plate and reflective element.
Figure 12:
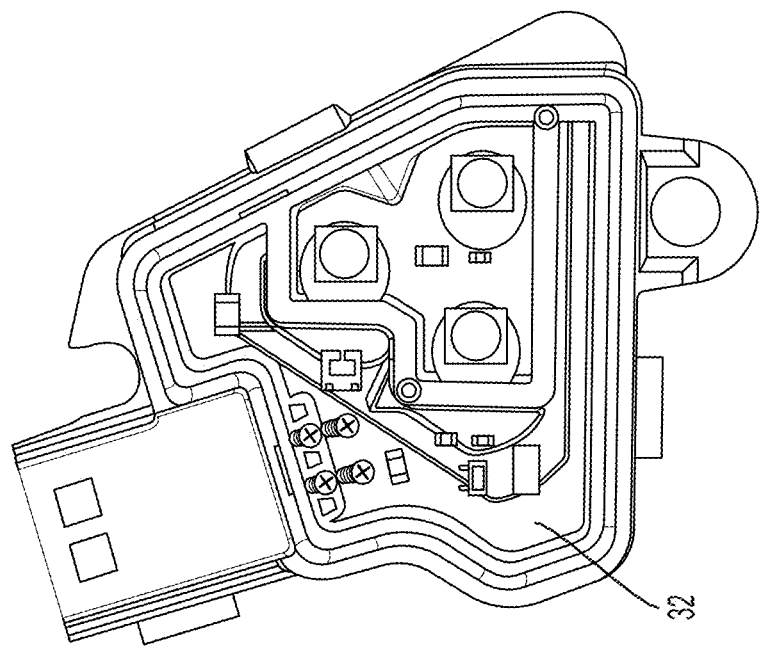
FIGS. 11 and 12 are rear views of the indicator module of the present invention.

The indicator housing portion has its inner reflective surface angled so as to direct the light toward the vehicle and toward a driver or occupant of the host vehicle. More particularly, the light beam emitted from the blind spot signal indicating module and transmitted through the reflective element is angled so as to have its principle beam axis directed generally toward the eyes of a driver seated in the interior cabin of the host vehicle. As shown in FIGS. 9 and 10, the housing may have its inner surface angled so as to direct or reflect the principal beam direction of the emitted light at an angle generally towards the driver of the vehicle, such as at an angle of at least about 15 degrees normal to the reflective element, preferably at least about 20 degrees normal to the reflective element, preferably about 25 degrees normal to the reflective element, and no more than about 35 degrees normal to the reflective element, such as at an angle between about 20 and 30 degrees, such as, for example, at an angle of about 24.5 degrees from normal or perpendicular to the glass (or about 65.5 degrees relative to the rear surface of the reflective element or thereabouts) so as to direct or guide light through the passageway and in the desired direction toward the side of the equipped/host vehicle for viewing the object/LCA indication principally or solely by the driver of the host vehicle. Should, however, the signal module be a turn signal module, then the indicator module may be configured to direct or reflect light generally outboard from the side of the vehicle so as to direct or guide light through the passageway and in the desired direction away from the side of the equipped/host vehicle for viewing the turn indication principally or solely by the drivers of overtaking vehicles and principally other than by the driver of the host vehicle.

The indicator or display is operable to provide three states from the driver's point of view. First, a display state "off" is provided where the indicator function is deactivated or the function is outside the specified functional range or there is no potentially hazardous vehicle in the adjacent lane. A display state where the display is continuously illuminated (such as an amber color or yellow color or the like) may be provided (where the indicator may be subliminally perceived, i.e., only by focused observation of the mirror), when the adjacent lane is occupied by a vehicle in the blind spot or a vehicle is approaching at speed from behind, meaning that it would be dangerous to change lanes into this lane (and in situations where the driver has not actuated a turn signal indicator of the vehicle). A third display state may provide a flashing indicator (such as a bright flashing yellow or amber indication), where the flashing sequence may be selected depending on the particular application of the indicator module. The display is active and can be perceived peripherally even if the driver is looking straight ahead. This flashing display is provided when the adjacent lane is occupied by a vehicle in the blind spot or a vehicle is approaching at speed from behind, and where the driver has actuated a turn signal indicator to show that he or she plans to change lanes. In such a situation, the indicator module warns against such a lane change.

The display element or icon may be illuminated with a basic brightness at a minimum actuation or dimming level when permanently actuated. For prolonged actuation with maximum icon display intensity, the display element may be illuminated at a brightness of at least about 4,000 cd/m$^2$ (±20%). In flashing actuation, the display elements may each be illuminated at a brightness of at least about 6,000 cd/m$^2$ (±20%). These values are mean values over the entire display surface. The deviation of ±20% applies to the maximum and minimum value of all surface points within this area for the achievement of a substantially homogeneous appearance. This homogeneity criterion applies across the entire brightness range (basic brightness through maximum brightness). For darker light conditions, the resolution of the individual brightness levels may be finer (below about 50 cd/m$^2$, the resolution per level may not exceed approximately 1.2 cd/m$^2$), as the human eye is more sensitive to changes in brightness in the lower brightness range. In the upper brightness range (above approximately 50 cd/m$^2$) the resolution can be coarser (the resolution per level can be up to about 15 cd/m$^2$).

A corresponding scaling from the input value to the maximum brightness of the basic brightness of about 4,000 cd/m$^2$ may be implemented in the form of a suitable lookup table, where at least 10 interpolation points may be provided. Between the individual interpolation points, transition is by means of linear interpolation. In addition, it may be ensured that, during each possible change of the brightness request by the partner control unit, the brightness adjustment of the LIN module does not lead to a jump in the brightness level that is perceptible to the driver. The requested brightness may be achieved in a time period of less than about 0.5 seconds or thereabouts.

The back plate may comprise any suitable back plate structure, and may be molded or formed, such as by injection molding, so as to provide the display receiving portion and a generally planar backing portion that attaches to the rear surface of the reflective element (such as via adhesive or other suitable attachment means). As shown in FIGS. 2-5, back plate 20 includes an aperture or hole at the mounting portion such that when signal indication module 22 is attached to the mounting portion of back plate 20, the front end of housing 24 and the diffuser element 36 of signal indication module 22 are positioned at and through the aperture and at or against the rear surface of the reflective element substrate. Preferably, back plate 20 is molded of a substantially dark or opaque or black material, such as from an ABS or PC-ABS or polycarbonate polymeric resin material or from any other suitable material such as known in the exterior rearview mirror art, so as to be substantially opaque such that light does not pass through the opaque back plate and the indicator mounting portion.

Optionally, and desirably, the indicator mounting portion or structure may be unitarily or integrally formed with back plate 20 and may be formed with a pocket for receiving or partially receiving housing 24 to locate signal indication module 22 at the generally planar backing portion of back plate 20. For example, the pocket may receive housing 24 at least partially therein, and the indicator mounting portion may secure (such as by snapping or the like) the housing at or in the pocket of the indicator mounting portion of back plate 20 (such as via tabs on the back plate engaging flanges or surfaces of the module housing to snap the signal indication module 22 to the back plate with the forward end of the housing and the indicia element urged toward and against the rear surface of the reflective element). The back plate and its indicator mounting portion and aperture may be formed in the plastic injection molding process.

Optionally, the back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. Nos. 8,058,977 and/or 7,581,859, which are hereby incorporated herein by reference in their entireties). The perimeter bezel portion may be narrow or small depending on the particular application of the reflective element and mirror reflector sub-assembly. Optionally, the mirror reflector sub-assembly may comprise a bezelless or frameless reflective element (such as the types described in U.S. Publication No. US-2006-0061008 and/or U.S. Pat. Nos. 7,184,190 and/or 7,255,451, and/or International Publication No. WO 2006/124682, which are hereby incorporated herein by reference in their entireties), whereby the back plate may not include a perimeter framing portion or bezel portion around the perimeter of the reflective element.

Back plate 20 may include an attachment element or elements (such as an annular ring or tab or annular prongs or annular snaps or the like) formed or established at the rear of the backing portion for attaching the back plate 20 and reflective element 18 to a mirror actuator (such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and/or 5,900,999, which are hereby incorporated herein by reference herein in their entireties), which is adjustable or operable to adjust a viewing angle of the mirror reflective element. When the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the indicator mounting portion and signal indication module. The back plate and signal indication module of the present invention thus utilizes the space within the mirror head or casing that is already available and typically not used or occupied by other components.

Optionally, and preferably, indicator element or display element or signal indication module may snap into the end or pocket of the indicator mounting portion or may otherwise be attached or stuck at the indicator mounting portion, and may have a gasket or seal at the signal indication module to provide a substantially water proof or water resistant or water tight seal at the signal indication module, whereby the signal indication module may be sealed at the indicator mounting portion, such as by gluing or pressing or screwing or gasketing or hermetically sealing or otherwise substantially sealing the signal indication module at the indicator mounting portion. The signal indication module may comprise a self-contained, unitary, sealed or substantially sealed, indicator module that includes the housing and cover element, an illumination source (such as one or more LEDs or the like), a DC converter with a voltage dropping resistor (such as described in U.S. Pat. Nos. 7,195,381; 6,902,284 and/or 6,690,268, which are hereby incorporated herein by reference in their entireties) and the electrical terminals or connector. The signal indication module thus may be connected to a power source and may be activated or energized to illuminate the display for viewing by the driver of the vehicle. Optionally, the electrical connections to the signal indication module may be made while the signal indication module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary signal indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

The blind spot indicators of the present invention thus are operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786 and/or 5,786,772, and/or of the reverse or backup aid systems, such as the rearwardly directed vehicle vision systems described in U.S. Pat. Nos. 5,550,677; 5,760,962; 5,670,935; 5,877,897; 6,201,642; 6,396,397; 6,498,620; 6,717,610; 6,757,109 and/or 7,005,974, and/or of the automatic headlamp controls described in U.S. Pat. Nos. 7,526,103; 5,796,094 and/or 5,715,093, and/or of the rain sensors described in U.S. Pat. Nos. 6,250,148 and/or 6,341,523, and/or of other imaging systems, such as the types described in U.S. Pat. Nos. 6,353,392 and/or 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962 and/or 5,796,094, and/or International Publication No. WO 2004/047421, with all of the above referenced U.S. patents and PCT applications being commonly assigned and being hereby incorporated herein by reference in their entireties.

The indicator icon, when the light source of the indicator is activated, may be viewable through a transflective mirror reflector of the mirror reflective element or may be viewable through a window that is formed (such as via ablation) at least partially through the mirror reflector of the mirror reflective element. The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,626,749; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,712,879; 7,195,381 and/or 7,255,451, and/or International Publication No. WO 2006/124682, which are all hereby incorporated herein by reference in their entireties.

Optionally, the reflective element may include a perimeter metallic band, such as the types described in U.S. Pat. Nos. 7,255,451 and 7,274,501, and International Publication Nos. WO 2004/026633 and/or WO 2004/042457, which are all hereby incorporated herein by reference in their entireties. Optionally, the reflective element may include indicia formed at and viewable at the reflective element, such as by utilizing aspects of the reflective elements described in U.S. Pat. No. 7,626,749, which is hereby incorporated herein by reference in its entirety.

Optionally, the reflective element may comprise a single substrate with a reflective coating at its rear surface, without affecting the scope of the present invention. The mirror assembly thus may comprise a prismatic mirror assembly or planar or non-planar mirror or other mirror having a single substrate reflective element, such as a mirror assembly utilizing aspects described in U.S. Pat. Nos. 7,249,860; 6,318,870; 6,598,980; 5,327,288; 4,948,242; 4,826,289; 4,436,371 and/or 4,435,042, and/or International Publication No. WO 2004/103772, which are hereby incorporated herein by reference in their entireties. Optionally, the reflective element may comprise a conventional prismatic or flat reflective element or prism, or may comprise a prismatic or flat reflective element of the types described in International Publication Nos. WO 2004/026633 and/or WO 2004/103772, and/or U.S. Pat. Nos. 7,420,756; 7,249,860; 7,255,451 and/or 7,338,177, which are all hereby incorporated herein by reference in their entireties, without affecting the scope of the present invention.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
 a mirror reflective element;
 wherein said mirror reflective element comprises a glass substrate coated with a mirror reflector;
 a mirror back plate, wherein said mirror back plate comprises a light-transmitting aperture;
 a blind zone indication module having a light source that is electrically powered to emit light;
 wherein said blind zone indication module is disposed at said mirror back plate, and wherein said light source is electrically powered to emit light through said mirror reflective element;
 wherein said light source comprises at least two light emitting diodes disposed at a circuit board of said blind zone indication module;
 wherein said circuit board comprises circuitry and electrically conductive terminals, and wherein said electrically conductive terminals extend into a connector portion of a housing of said blind zone indication module;
 wherein said connector portion, with said electrically conductive terminals therein, is configured to connect to a connector of a wire harness of the vehicular exterior rearview mirror assembly;
 wherein said circuit board comprises a constant current circuit, and wherein the constant current circuit generates a constant current over a range of voltages provided via the wire harness of the vehicular exterior rearview mirror assembly by a power source of a vehicle equipped with the vehicular exterior rearview mirror assembly;
 wherein at least two light emitting diodes of the at least two light emitting diodes are electrically connected in series at said circuit board;
 wherein said blind zone indication module comprises a diffuser that diffuses light emitted by the at least two light emitting diodes when the at least two light emitting diodes are electrically powered to emit light;
 wherein, when the at least two light emitting diodes electrically connected in series at said circuit board are electrically powered to emit light, light emitted by the at least two light emitting diodes passing through (i) a light-transmitting portion of said housing of said blind zone indication module and (ii) the light-transmitting aperture of said mirror back plate illuminates an icon that is viewable to a driver of the equipped vehicle who views said mirror reflective element of the vehicular exterior rearview mirror assembly;
 wherein the icon comprises a light-transmitting window through said mirror reflector of said glass substrate of said mirror reflective element; and
 wherein illumination of the icon is responsive to a blind spot detection system of the equipped vehicle detecting presence of another vehicle that is traveling in the same direction as that of the equipped vehicle in a lane adjacent to a lane that the equipped vehicle is traveling in and that is approaching or is overtaking the equipped vehicle.

2. The vehicular exterior rearview mirror assembly of claim 1, wherein said mirror reflective element comprises an electrochromic mirror reflective element, and wherein the electrochromic mirror reflective element comprises a front glass substrate having a first surface and an opposing second surface spaced from the first surface by a thickness dimension of the front glass substrate, and wherein the electrochromic mirror reflective element comprises a rear glass substrate having a third surface and an opposing fourth surface spaced from the third surface by a thickness dimension of the rear glass substrate, and wherein the rear glass substrate comprises said mirror reflector.

3. The vehicular exterior rearview mirror assembly of claim 2, wherein the electrochromic mirror reflective element comprises an electrochromic medium disposed between the second surface of the front glass substrate and the third surface of the rear glass substrate, the electrochromic medium bounded by a perimeter seal that spaces the third surface of the rear glass substrate from the second surface of the front glass substrate, and wherein the fourth surface of the rear glass substrate of the electrochromic mirror reflective element comprises a rear side of said mirror reflective element, and wherein the third surface of the rear glass substrate is coated with said mirror reflector.

4. The vehicular exterior rearview mirror assembly of claim 3, wherein no dimension of the rear glass substrate of the electrochromic mirror reflective element extends beyond any dimension of the front glass substrate of the electrochromic mirror reflective element, and wherein a perimeter metallic band circumscribes a border region of the second surface of the front glass substrate of the electrochromic mirror reflective element, the perimeter metallic band masking the perimeter seal of the electrochromic mirror reflective element from direct view by the driver of the equipped vehicle.

5. The vehicular exterior rearview mirror assembly of claim 1, wherein luminance of the icon, when illuminated, changes with ambient light at the equipped vehicle.

6. The vehicular exterior rearview mirror assembly of claim 5, wherein the ambient light at the equipped vehicle is sensed by a photosensor of the equipped vehicle, and wherein luminance of the icon, when illuminated, varies responsive to an output of the photosensor.

7. The vehicular exterior rearview mirror assembly of claim 6, wherein luminance of the icon, when illuminated, changes in accordance with pulse width modulation of voltage applied to the at least two light emitting diodes when electrically powered to emit light.

8. The vehicular exterior rearview mirror assembly of claim 1, wherein said blind zone indication module is operable during a nighttime driving condition of the equipped vehicle to illuminate the icon of said mirror reflective element that is viewed by the driver of the equipped vehicle with a luminance of less than 1,000 candelas per square meter as viewed by the driver.

9. The vehicular exterior rearview mirror assembly of claim 8, wherein said blind zone indication module is operable during a nighttime driving condition of the equipped vehicle to illuminate the icon of said mirror reflective element that is viewed by the driver of the equipped vehicle with a luminance of less than 800 candelas per square meter as viewed by the driver.

10. The vehicular exterior rearview mirror assembly of claim 1, wherein, as daytime transitions to dusk and then to night, luminance of the icon, when illuminated, decreases.

11. The vehicular exterior rearview mirror assembly of claim 10, wherein, as daytime transitions to dusk and then to night, luminance of the icon, when illuminated, progressively decreases.

12. The vehicular exterior rearview mirror assembly of claim 10, wherein, as daytime transitions to dusk and then to night, luminance of the icon, when illuminated, stepwise decreases.

13. The vehicular exterior rearview mirror assembly of claim 10, wherein, as daytime transitions to dusk and then to night, luminance of the icon, when illuminated, decreases responsive to ambient light detection by a photosensor of the equipped vehicle.

14. The vehicular exterior rearview mirror assembly of claim 1, wherein the icon comprises a triangular shape.

15. The vehicular exterior rearview mirror assembly of claim 1, wherein the constant current generated by the constant current circuit that is passed by any one of the at least two light emitting diodes when electrically powered to emit light has an amperage less than 100 milliamps.

16. The vehicular exterior rearview mirror assembly of claim 15, wherein the at least two light emitting diodes comprise three light emitting diodes that are electrically connected in series at said circuit board.

17. A vehicular exterior rearview mirror assembly, the vehicular exterior rearview mirror assembly comprising:
a mirror reflective element;
wherein said mirror reflective element comprises a glass substrate coated with a mirror reflector;
a mirror back plate, wherein said mirror back plate comprises a light-transmitting aperture;
a blind zone indication module having a light source that is electrically powered to emit light;
wherein said blind zone indication module is disposed at said mirror back plate, and wherein said light source is electrically powered to emit light through said mirror reflective element;
wherein said light source comprises at least two light emitting diodes disposed at a circuit board of said blind zone indication module;
wherein said circuit board comprises circuitry and electrically conductive terminals, and wherein said electrically conductive terminals extend into a connector portion of a housing of said blind zone indication module;
wherein said connector portion, with said electrically conductive terminals therein, is configured to connect to a connector of a wire harness of the vehicular exterior rearview mirror assembly;
wherein said circuit board comprises a constant current circuit, and wherein the constant current circuit generates a constant current over a range of voltages provided via the wire harness of the vehicular exterior rearview mirror assembly by a power source of a vehicle equipped with the vehicular exterior rearview mirror assembly;
wherein at least two light emitting diodes of the at least two light emitting diodes are electrically connected in series at said circuit board;
wherein the constant current generated by the constant current circuit that is passed by any one of the at least two light emitting diodes when electrically powered to emit light has an amperage less than 100 milliamps;
wherein said blind zone indication module comprises a diffuser that diffuses light emitted by the at least two light emitting diodes when the at least two light emitting diodes are electrically powered to emit light;
wherein, when the at least two light emitting diodes electrically connected in series at said circuit board are electrically powered to emit light, light emitted by the at least two light emitting diodes passing through (i) a light-transmitting portion of said housing of said blind zone indication module and (ii) the light-transmitting aperture of said mirror back plate illuminates an icon that is viewable to a driver of the equipped vehicle who views said mirror reflective element of the vehicular exterior rearview mirror assembly;
wherein the icon comprises a light-transmitting window through said mirror reflector of said glass substrate of said mirror reflective element;
wherein illumination of the icon is responsive to a blind spot detection system of the equipped vehicle detecting presence of another vehicle that is traveling in the same direction as that of the equipped vehicle in a lane adjacent to a lane that the equipped vehicle is traveling in and that is approaching or is overtaking the equipped vehicle; and wherein said blind zone indication module is operable during a daytime driving condition of the equipped vehicle to illuminate the icon of said mirror reflective element that is viewed by the driver of the equipped vehicle with a luminance of at least 4,000 candelas per square meter as viewed by the driver.

18. The vehicular exterior rearview mirror assembly of claim 17, wherein said blind zone indication module is operable during a daytime driving condition of the equipped vehicle to illuminate the icon of said mirror reflective element that is viewed by the driver of the equipped vehicle with a luminance of at least 6,000 candelas per square meter as viewed by the driver.

19. The vehicular exterior rearview mirror assembly of claim 17, wherein said mirror reflective element comprises an electrochromic mirror reflective element, and wherein the electrochromic mirror reflective element comprises a front glass substrate having a first surface and an opposing second surface spaced from the first surface by a thickness dimension of the front glass substrate, and wherein the electrochromic mirror reflective element comprises a rear glass substrate having a third surface and an opposing fourth surface spaced from the third surface by a thickness dimension of the rear glass substrate, and wherein the rear glass substrate comprises said mirror reflector, and wherein no dimension of the rear glass substrate of the electrochromic mirror reflective element extends beyond any dimension of the front glass substrate of the electrochromic mirror reflective element, and wherein a perimeter metallic band circumscribes a border region of the second surface of the front glass substrate of the electrochromic mirror reflective element, the perimeter metallic band masking a perimeter seal of the electrochromic mirror reflective element from direct view by the driver of the equipped vehicle.

20. The vehicular exterior rearview mirror assembly of claim 19, wherein the electrochromic mirror reflective element comprises an electrochromic medium disposed between the second surface of the front glass substrate and the third surface of the rear glass substrate, the electrochromic medium bounded by the perimeter seal that spaces the third surface of the rear glass substrate from the second surface of the front glass substrate, and wherein the fourth surface of the rear glass substrate of the electrochromic mirror reflective element comprises a rear side of said mirror reflective element, and wherein the third surface of the rear glass substrate is coated with said mirror reflector.

21. The vehicular exterior rearview mirror assembly of claim 17, wherein luminance of the icon, when illuminated, changes with ambient light at the equipped vehicle, and wherein the ambient light at the equipped vehicle is sensed by a photosensor of the equipped vehicle, and wherein luminance of the icon, when illuminated, varies responsive to an output of the photosensor.

22. The vehicular exterior rearview mirror assembly of claim 17, wherein luminance of the icon, when illuminated, changes in accordance with pulse width modulation of voltage applied to the at least two light emitting diodes when electrically powered to emit light.

23. The vehicular exterior rearview mirror assembly of claim 22, wherein said blind zone indication module is operable during a nighttime driving condition of the equipped vehicle to illuminate the icon of said mirror reflective element that is viewed by the driver of the equipped vehicle with a luminance of less than 1,000 candelas per square meter as viewed by the driver.

24. The vehicular exterior rearview mirror assembly of claim 23, wherein said blind zone indication module is operable during a nighttime driving condition of the equipped vehicle to illuminate the icon of said mirror reflective element that is viewed by the driver of the equipped vehicle with a luminance of less than 800 candelas per square meter as viewed by the driver.

25. The vehicular exterior rearview mirror assembly of claim 17, wherein the icon comprises a triangular shape.

26. The vehicular exterior rearview mirror assembly of claim 17, wherein the at least two light emitting diodes comprise three light emitting diodes that are electrically connected in series at said circuit board.

27. A vehicular exterior rearview mirror assembly, the vehicular exterior rearview mirror assembly comprising:
a mirror reflective element;
wherein said mirror reflective element comprises a glass substrate coated with a mirror reflector;
a mirror back plate, wherein said mirror back plate comprises a light-transmitting aperture;
a blind zone indication module having a light source that is electrically powered to emit light;
wherein said blind zone indication module is disposed at said mirror back plate, and wherein said light source is electrically powered to emit light through said mirror reflective element;
wherein said light source comprises at least two light emitting diodes disposed at a circuit board of said blind zone indication module;
wherein said circuit board comprises circuitry and electrically conductive terminals, and wherein said electrically conductive terminals extend into a connector portion of a housing of said blind zone indication module;
wherein said connector portion, with said electrically conductive terminals therein, is configured to connect to a connector of a wire harness of the vehicular exterior rearview mirror assembly;
wherein said circuit board comprises a constant current circuit, and wherein the constant current circuit generates a constant current over a range of voltages provided via the wire harness of the vehicular exterior rearview mirror assembly by a power source of a vehicle equipped with the vehicular exterior rearview mirror assembly;
wherein at least two light emitting diodes of the at least two light emitting diodes are electrically connected in series at said circuit board;
wherein the constant current generated by the constant current circuit that is passed by any one of the at least two light emitting diodes when electrically powered to emit light has an amperage less than 100 milliamps;
wherein said blind zone indication module comprises a diffuser that diffuses light emitted by the at least two light emitting diodes when the at least two light emitting diodes are electrically powered to emit light;
wherein, when the at least two light emitting diodes electrically connected in series at said circuit board are electrically powered to emit light, light emitted by the at least two light emitting diodes passing through (i) a light-transmitting portion of said housing of said blind zone indication module and (ii) the light-transmitting aperture of said mirror back plate illuminates an icon that is viewable to a driver of the equipped vehicle who views said mirror reflective element of the vehicular exterior rearview mirror assembly;

wherein the icon comprises a light-transmitting window through said mirror reflector of said glass substrate of said mirror reflective element;

wherein luminance of the icon, when illuminated, changes in accordance with pulse width modulation of voltage applied to the at least two light emitting diodes when electrically powered to emit light; and wherein illumination of the icon is responsive to a blind spot detection system of the equipped vehicle detecting presence of another vehicle that is traveling in the same direction as that of the equipped vehicle in a lane adjacent to a lane that the equipped vehicle is traveling in and that is approaching or is overtaking the equipped vehicle.

28. The vehicular exterior rearview mirror assembly of claim 27, wherein said mirror reflective element comprises an electrochromic mirror reflective element, and wherein the electrochromic mirror reflective element comprises a front glass substrate having a first surface and an opposing second surface spaced from the first surface by a thickness dimension of the front glass substrate, and wherein the electrochromic mirror reflective element comprises a rear glass substrate having a third surface and an opposing fourth surface spaced from the third surface by a thickness dimension of the rear glass substrate, and wherein the rear glass substrate comprises said mirror reflector, and wherein no dimension of the rear glass substrate of the electrochromic mirror reflective element extends beyond any dimension of the front glass substrate of the electrochromic mirror reflective element, and wherein a perimeter metallic band circumscribes a border region of the second surface of the front glass substrate of the electrochromic mirror reflective element, the perimeter metallic band masking a perimeter seal of the electrochromic mirror reflective element from direct view by the driver of the equipped vehicle.

29. The vehicular exterior rearview mirror assembly of claim 28, wherein the electrochromic mirror reflective element comprises an electrochromic medium disposed between the second surface of the front glass substrate and the third surface of the rear glass substrate, the electrochromic medium bounded by the perimeter seal that spaces the third surface of the rear glass substrate from the second surface of the front glass substrate, and wherein the fourth surface of the rear glass substrate of the electrochromic mirror reflective element comprises a rear side of said mirror reflective element, and wherein the third surface of the rear glass substrate is coated with said mirror reflector.

30. The vehicular exterior rearview mirror assembly of claim 28, wherein said blind zone indication module is operable during a daytime driving condition of the equipped vehicle to illuminate the icon of said mirror reflective element that is viewed by the driver of the equipped vehicle with a luminance of at least 4,000 candelas per square meter as viewed by the driver.

31. The vehicular exterior rearview mirror assembly of claim 30, wherein said blind zone indication module is operable during a daytime driving condition of the equipped vehicle to illuminate the icon of said mirror reflective element that is viewed by the driver of the equipped vehicle with a luminance of at least 6,000 candelas per square meter as viewed by the driver.

32. The vehicular exterior rearview mirror assembly of claim 30, wherein said blind zone indication module is operable during a nighttime driving condition of the equipped vehicle to illuminate the icon of said mirror reflective element that is viewed by the driver of the equipped vehicle with a luminance of less than 1,000 candelas per square meter as viewed by the driver.

33. The vehicular exterior rearview mirror assembly of claim 32, wherein said blind zone indication module is operable during a nighttime driving condition of the equipped vehicle to illuminate the icon of said mirror reflective element that is viewed by the driver of the equipped vehicle with a luminance of less than 800 candelas per square meter as viewed by the driver.

34. The vehicular exterior rearview mirror assembly of claim 28, wherein luminance of the icon, when illuminated, changes with ambient light at the equipped vehicle, and wherein the ambient light at the equipped vehicle is sensed by a photosensor of the equipped vehicle, and wherein luminance of the icon, when illuminated, varies responsive to an output of the photosensor.

35. The vehicular exterior rearview mirror assembly of claim 28, wherein the icon comprises a triangular shape.

36. The vehicular exterior rearview mirror assembly of claim 27, wherein the at least two light emitting diodes comprise three light emitting diodes that are electrically connected in series at said circuit board.

* * * * *